United States Patent
Matsuda

(10) Patent No.: US 9,813,604 B2
(45) Date of Patent: Nov. 7, 2017

(54) MANAGEMENT METHOD FOR NETWORK SYSTEM AND NETWORK DEVICE, NETWORK DEVICE AND CONTROL METHOD THEREFOR, AND MANAGEMENT SYSTEM

(71) Applicant: CANON KABUSHIKI KAISHA, Tokyo (JP)

(72) Inventor: Kotaro Matsuda, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 398 days.

(21) Appl. No.: 14/501,597

(22) Filed: Sep. 30, 2014

(65) Prior Publication Data

US 2015/0109438 A1  Apr. 23, 2015

(30) Foreign Application Priority Data

Oct. 21, 2013  (JP) .................... 2013-218674

(51) Int. Cl.

| | |
|---|---|
| H04N 7/18 | (2006.01) |
| H04N 5/232 | (2006.01) |
| H04N 5/76 | (2006.01) |
| H04N 9/82 | (2006.01) |
| H04N 21/2187 | (2011.01) |
| H04N 21/472 | (2011.01) |

(Continued)

(52) U.S. Cl.
CPC ...... *H04N 5/23206* (2013.01); *H04N 5/23216* (2013.01); *H04N 5/76* (2013.01); *H04N 7/181* (2013.01); *H04N 9/8205* (2013.01); *H04N 21/2187* (2013.01); *H04N 21/47202* (2013.01); *H04N 21/482* (2013.01); *H04N 21/6587* (2013.01)

(58) Field of Classification Search
CPC .. H04N 5/23206; H04N 5/23216; H04N 5/76; H04N 7/181; H04N 9/8205; H04N 21/2187; H04N 21/47202; H04N 21/482; H04N 21/6587
See application file for complete search history.

(56) References Cited

U.S. PATENT DOCUMENTS 5,509,009 A  *  4/1996  Laycock ............ H04Q 11/0435
                                                              348/14.08
6,583,813 B1     6/2003  Enright et al.
(Continued)

FOREIGN PATENT DOCUMENTS

| JP | 2007-104149 A | 4/2007 |
|---|---|---|
| JP | 2008-197152 A | 8/2008 |

OTHER PUBLICATIONS

Horiyama, U.S. Appl. No. 14/503,852, filed Oct. 1, 2014, "Network system and device management method", pp. 1-30.
(Continued)

*Primary Examiner* — Nhon Diep
(74) *Attorney, Agent, or Firm* — Carter, DeLuca, Farrell & Schmidt, LLP

(57) ABSTRACT

A log is recorded when an event occurs in an image forming apparatus, a video file recorded by a network camera is tagged at the point in time that the event occurred, and video tag information tagged to the recorded video file is registered in relation to a device serial ID of the image forming apparatus and an ID for uniquely identifying the log in the image forming apparatus.

15 Claims, 21 Drawing Sheets

(51) Int. Cl.
*H04N 21/482* (2011.01)
*H04N 21/6587* (2011.01)

(56) References Cited

U.S. PATENT DOCUMENTS

| | | | |
|---|---|---|---|
| 6,698,021 B1 | 2/2004 | Amini et al. | |
| 7,802,724 B1* | 9/2010 | Nohr | G07C 9/00111 |
| | | | 235/384 |
| 8,103,545 B2* | 1/2012 | Ramer | G06Q 30/0247 |
| | | | 705/14.49 |
| 9,143,672 B2* | 9/2015 | Creamer | H04N 1/00214 |
| 2003/0202099 A1 | 10/2003 | Nakamura et al. | |
| 2005/0132414 A1 | 6/2005 | Bentley et al. | |
| 2006/0068818 A1* | 3/2006 | Leitersdorf | H04H 20/18 |
| | | | 455/466 |
| 2007/0174489 A1* | 7/2007 | Iwabuchi | G06F 17/3028 |
| | | | 709/246 |
| 2010/0295944 A1 | 11/2010 | Takeuchi et al. | |
| 2011/0122995 A1* | 5/2011 | Ferro, Jr. | A61B 6/4429 |
| | | | 378/62 |
| 2011/0157227 A1* | 6/2011 | Ptucha | H04N 5/232 |
| | | | 345/638 |
| 2012/0154608 A1* | 6/2012 | Ko | G11B 27/034 |
| | | | 348/207.11 |
| 2012/0195425 A1* | 8/2012 | Kim | H04L 9/065 |
| | | | 380/200 |
| 2012/0229633 A1* | 9/2012 | Boucino | H04N 7/183 |
| | | | 348/143 |
| 2013/0235234 A1* | 9/2013 | Cucci | H04N 5/23206 |
| | | | 348/231.99 |
| 2014/0168432 A1 | 6/2014 | Nystrom | |
| 2014/0370958 A1* | 12/2014 | Lutnick | G07F 17/3276 |
| | | | 463/17 |
| 2016/0027076 A1* | 1/2016 | Jackson | H04L 67/1095 |
| | | | 709/217 |
| 2016/0105847 A1* | 4/2016 | Smith | H04L 67/125 |
| | | | 370/252 |

OTHER PUBLICATIONS

U.S. Office Action issued in corresponding U.S. Appl. No. 14/503,852 dated Dec. 22, 2016.
U.S. Office Action issued in corresponding U.S. Appl. No. 14/503,852 dated Jul. 11, 2017.

* cited by examiner

FIG. 4A

DEVICE MANAGEMENT TABLE 400

| DEVICE SERIAL ID | IP ADDRESS | MANUFACTURER NAME | MODEL NAME | DEVICE TYPE | COLOR CLASSIFICATION | INSTALLATION LOCATION |
|---|---|---|---|---|---|---|
| NNN000001 | 192.168.1.101 | OANON | C5000 | MFP | COLOR | 1F |
| NNN000002 | 192.168.1.102 | OANON | L3500 | SFP | MONOCHROME | 3F |
| 401 | 402 | 403 | 404 | 405 | 406 | 407 |

FIG. 4B

NETWORK CAMERA MANAGEMENT TABLE 410

| IP ADDRESS | MANUFACTURER NAME | MODEL NAME | CAMERA TYPE | CAMERA NAME | INSTALLATION LOCATION |
|---|---|---|---|---|---|
| 192.168.2.101 | OANON | WV-1 | PAN/TILT | WV-1(1F RoomA) | 1F RoomA |
| 192.168.2.102 | OANON | WV-9 | WIDE-ANGLED | WV-9(3F RoomC) | 3F RoomC |
| 192.168.2.103 | OANON | WV-11 | FIXED BOX-TYPE | WV-11(4F RoomD) | 4F RoomD |
| 411 | 412 | 413 | 414 | 415 | 416 |

FIG. 5

| JOB ID | JOB START DATE-TIME | JOB END DATE-TIME | JOB NAME | JOB EXECUTOR NAME | JOB EXIT CODE | JOB TYPE |
|---|---|---|---|---|---|---|
| J001-00000001 | 2012/05/14 14:00:11 | 2012/05/14 14:02:33 | Presentation.PDF | XYZ | 1 | PRINT |
| J001-00000002 | 2012/05/14 15:25:41 | 2012/05/14 15:26:02 | COPY 002 | ABC | 1 | COPY |

| PAPER SIZE | NO. OF COLOR PAGES | NO. OF MONOCHROME PAGES | N-UP SETTING | DOUBLE-SIDED SETTING | NO. OF COLOR SHEETS | NO. OF MONOCHROME SHEETS | NO. OF PRINT SHEETS |
|---|---|---|---|---|---|---|---|
| A4 | 20 | 10 | 2 | ON | 9 | 6 | 8 |
| A4 | 8 | 0 | 1 | ON | 8 | 0 | 4 |

| ERROR ID | ERROR START DATE-TIME | ERROR END DATE-TIME | ERROR LEVEL | ERROR CODE | LOCATION |
|---|---|---|---|---|---|
| E001-00000001 | 2012/05/15 09:22:43 | 2012/05/15 09:32:02 | WARNING | E62001 | MAIN BODY |
| E001-00000002 | 2012/05/15 11:12:53 | 2012/05/15 13:05:13 | ERROR | E19005 | FINISHER A1 |

| EVENT ID | EVENT DATE-TIME | USER ID | OPERATION CODE | OPERATION CONTENT |
|---|---|---|---|---|
| P001-00000001 | 2012/05/16 16:43:12 | USER001 | L10001 | LOGIN |
| P001-00000002 | 2012/05/16 18:02:01 | USER002 | M00231 | ADMINISTRATOR SCREEN DISPLAY |

| JOB ID/ERROR ID/ EVENT ID | VIDEO TAG INFORMATION |
|---|---|
| E001-00000001 | 192.168.2.101/PresetNumber=2/20130513092300 |
| E001-00000002 | 192.168.2.101/PresetNumber=7/20130523110000 |

JOB LOG TABLE (700)

| DEVICE SERIAL ID | JOB ID | JOB START DATE-TIME | JOB END DATE-TIME | JOB NAME | JOB EXECUTOR NAME | JOB EXIT CODE | JOB TYPE |
|---|---|---|---|---|---|---|---|
| NNN000001 | J001-00000001 | 2012/05/14 14:00:11 | 2012/05/14 14:02:33 | Presentaion.PDF | XYZ | 1 | PRINT |
| NNN000001 | J001-00000002 | 2012/05/14 15:25:41 | 2012/05/14 15:26:02 | Report.PDF | XYZ | 1 | COPY |

ERROR LOG TABLE (710)

| DEVICE SERIAL ID | ERROR ID | ERROR START DATE-TIME | ERROR END DATE-TIME | ERROR LEVEL | ERROR CODE | LOCATION |
|---|---|---|---|---|---|---|
| NNN000001 | E001-00000001 | 2012/05/15 09:22:43 | 2012/05/15 09:32:02 | WARNING | E62001 | MAIN BODY |
| NNN000001 | E001-00000002 | 2012/05/15 11:12:53 | 2012/05/15 13:05:13 | ERROR | E19005 | FINISHER A1 |

OPERATION LOG TABLE (720)

| DEVICE SERIAL ID | EVENT ID | EVENT DATE-TIME | USER ID | OPERATION CODE | OPERATION CONTENT |
|---|---|---|---|---|---|
| NNN000001 | P001-00000001 | 2012/05/16 16:43:12 | USER001 | L10001 | LOGIN |
| NNN000001 | P001-00000002 | 2012/05/16 18:02:01 | USER002 | E00231 | ADMINISTRATOR SCREEN DISPLAY |

| CAMERA OPTION MANAGEMENT TABLE | | | |
|---|---|---|---|
| DEVICE SERIAL ID | NETWORK CAMERA IP ADDRESS | NETWORK CAMERA PRESET INFORMATION | SURVEILLANCE LEVEL |
| NNN000001 | 192.168.1.101 | N/A | 2 |
| ... | ... | ... | ... |
| NNN000002 | 192.168.1.102 | PresetNumber=1 | 1 |
| NNN000002 | 192.168.1.103 | PresetNumber=3 | 3 |
| ... | ... | ... | ... |
| NNN000003 | 192.168.1.104 | PresetNumber=4 | 1 |
| NNN000004 | 192.168.1.104 | PresetNumber=8 | 3 |

| RECORDING TARGET EVENT MANAGEMENT TABLE | |
|---|---|
| LOG TYPE | JOB TYPE/ERROR CODE/OPERATION CODE |
| JOB LOG | COPY |
| ERROR LOG | E62001 |
| OPERATION LOG | L10001 |

| VIDEO TAG INFORMATION MANAGEMENT TABLE ||||
|---|---|---|---|
| DEVICE SERIAL ID | LOG TYPE | JOB ID/ERROR ID/ EVENT ID | VIDEO TAG INFORMATION |
| NNN000001 | JOB LOG | J001-00000001 | 192.168.2.101/PresetNumber= 2/201305130923000 |
| NNN000002 | ERROR LOG | E001-00000552 | 192.168.2.102/PresetNumber= 7/20130523110000 |
| 901 | 902 | 903 | 904 |

| PRESET SETTINGS MANAGEMENT TABLE |||||||
|---|---|---|---|---|---|---|
| PRESET NUMBER | PRESET NAME | PAN | TILT | ZOOM | FOCUS MODE ... | SURVEILLANCE PRIORITY |
| 1 | TOWARD ENTRANCE | 23.2 | -12.2 | 12 | AUTO ... | 1 |
| 2 | ENTIRE ROOM | -10.9 | 50.7 | 5 | MANUAL ... | 3 |
| 3 | TOWARD WINDOW | 128.0 | 24.1 | 6 | AUTO ... | 2 |
| 1001 | 1002 | 1003 | 1004 | 1005 | 1006 | 1007 |

| TAG INFORMATION MANAGEMENT TABLE |||
|---|---|---|
| TAG | VIDEO FILE PATH | TIMELINE INFORMATION |
| 192.168.2.101/PresetNumber= 7/20130523113423 | \\file-server\cameras\192.168.2.101 \20130523110000.mp4 | 00:34:23.000 |
| 1011 | 1012 | 1013 |

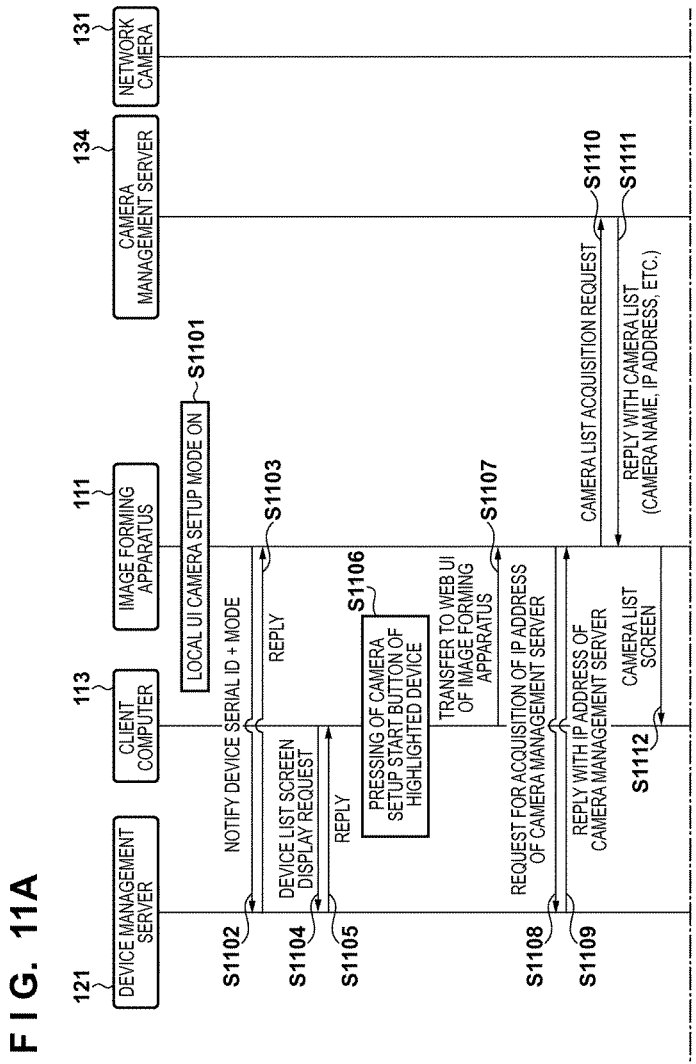

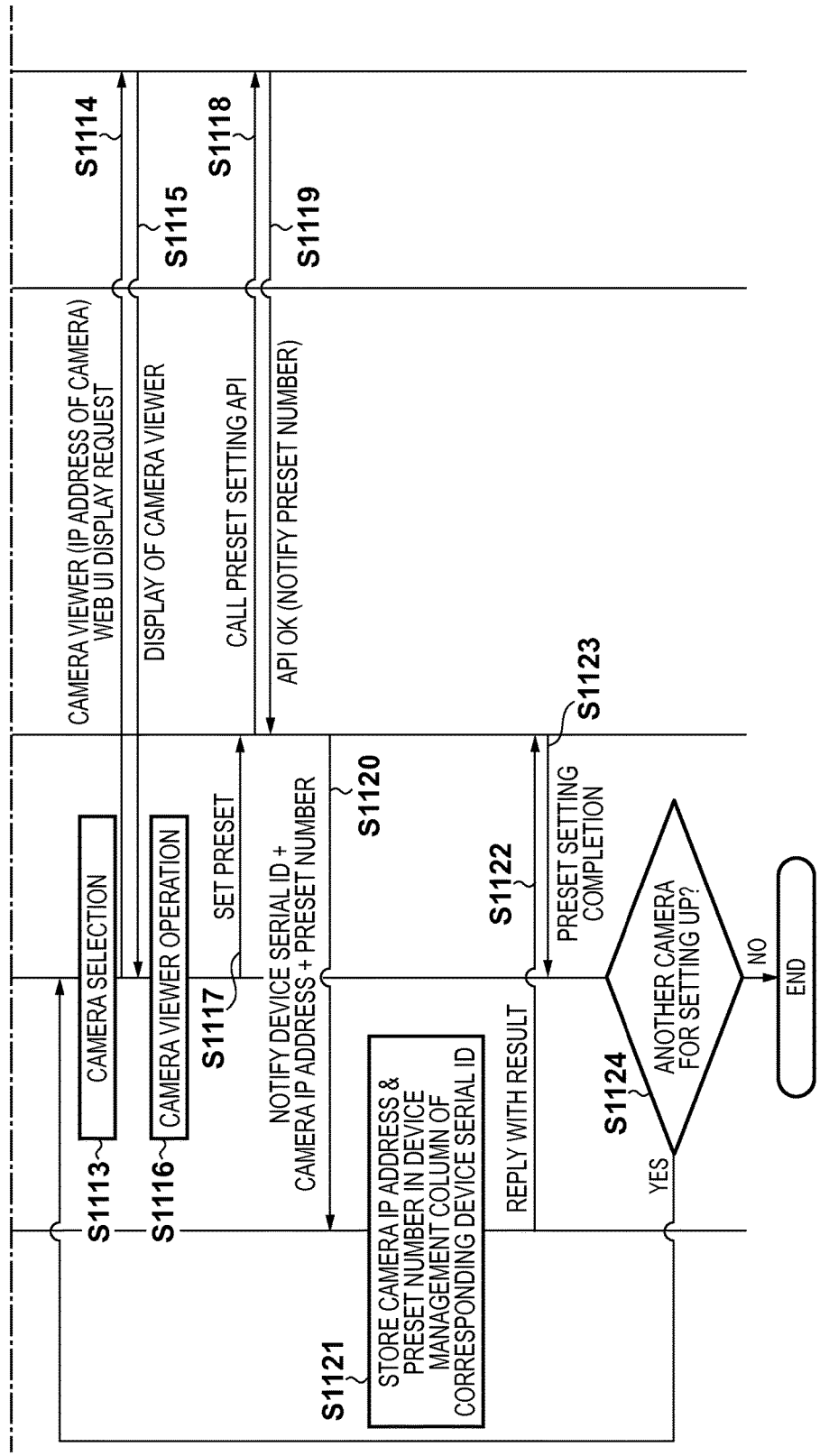

| DEVICE LIST | | | | | |
|---|---|---|---|---|---|
| DEVICE NAME | INSTALLATION LOCATION | IP ADDRESS | STATUS | MODE | CAMERA OPTION SETTINGS |
| C5000 | 3F | 192.168.1.101 | OPERATING | ⚠ CAMERA SETUP | SETTING START |
| L3500 | 3F | 192.168.1.102 | POWER SAVING | N/A | SETTING START |

THIS SCREEN IS FOR SETTING UP A CAMERA FOR MONITORING C5000(192.168.1.101)

1. SELECT CAMERA TO MANIPULATE

2. MANIPULATE CAMERA WITH CAMERA VIEWER AND SET POSITION FOR CAPTURING DEVICE TARGETED FOR SURVEILLANCE

1211 — CAMERA LIST

CAMERA VIEWER [WV-9(3F RoomA)]

WV-9(3F RoomC)

WV-1(2F)

WV-1(1F)

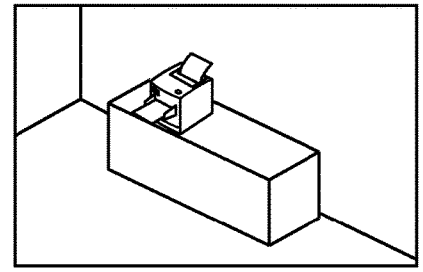

Zoom In
Zoom Out
ADVANCED SETTINGS

1212 — NARROW DOWN

1214 — 3. SURVEILLANCE LEVEL  ☑ SET SURVEILLANCE LEVEL   ◉ 1: GOOD
○ 2: AVERAGE
○ 3: POOR

1215 — 4. SELECT SURVEILLANCE PRIORITY (IF OTHER DEVICE SURVEILLANCE SETTINGS EXIST FOR THE SAME CAMERA)

2 ▼

5. REGISTER CAMERA PRESET FOR CURRENT IMAGE CAPTURE POSITION

PRESET NAME: TOWARD WINDOW   REGISTER

1216

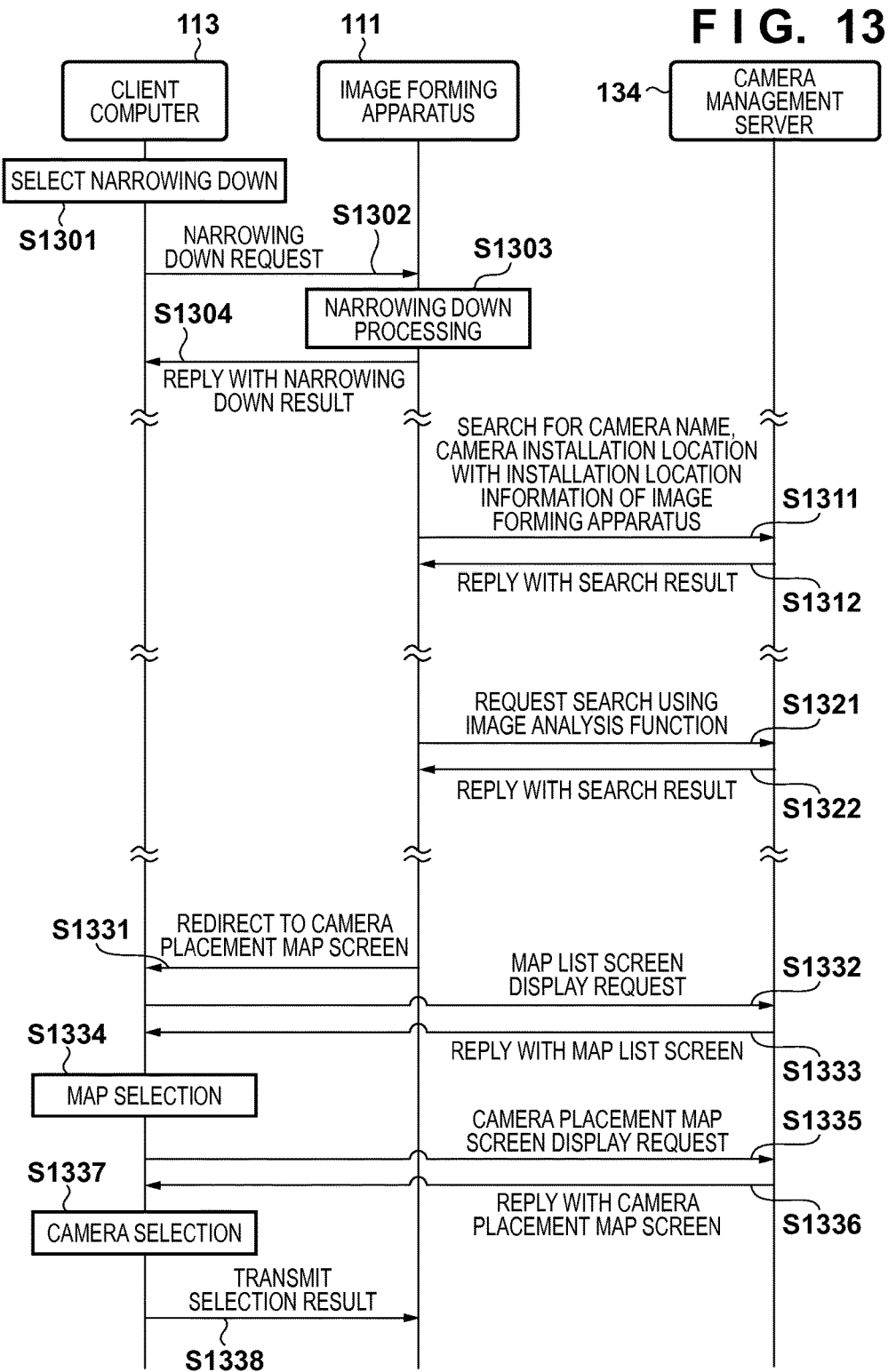

F I G. 14
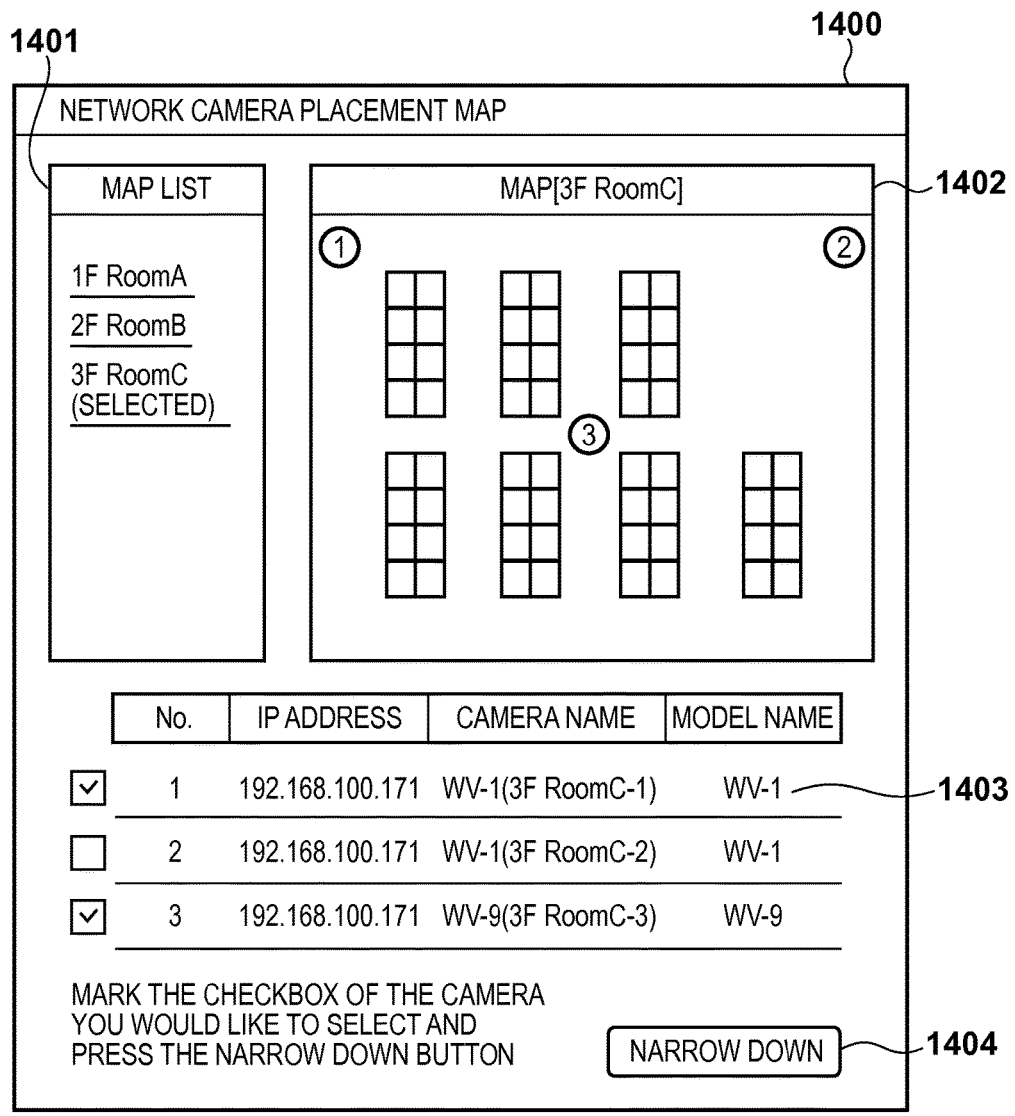

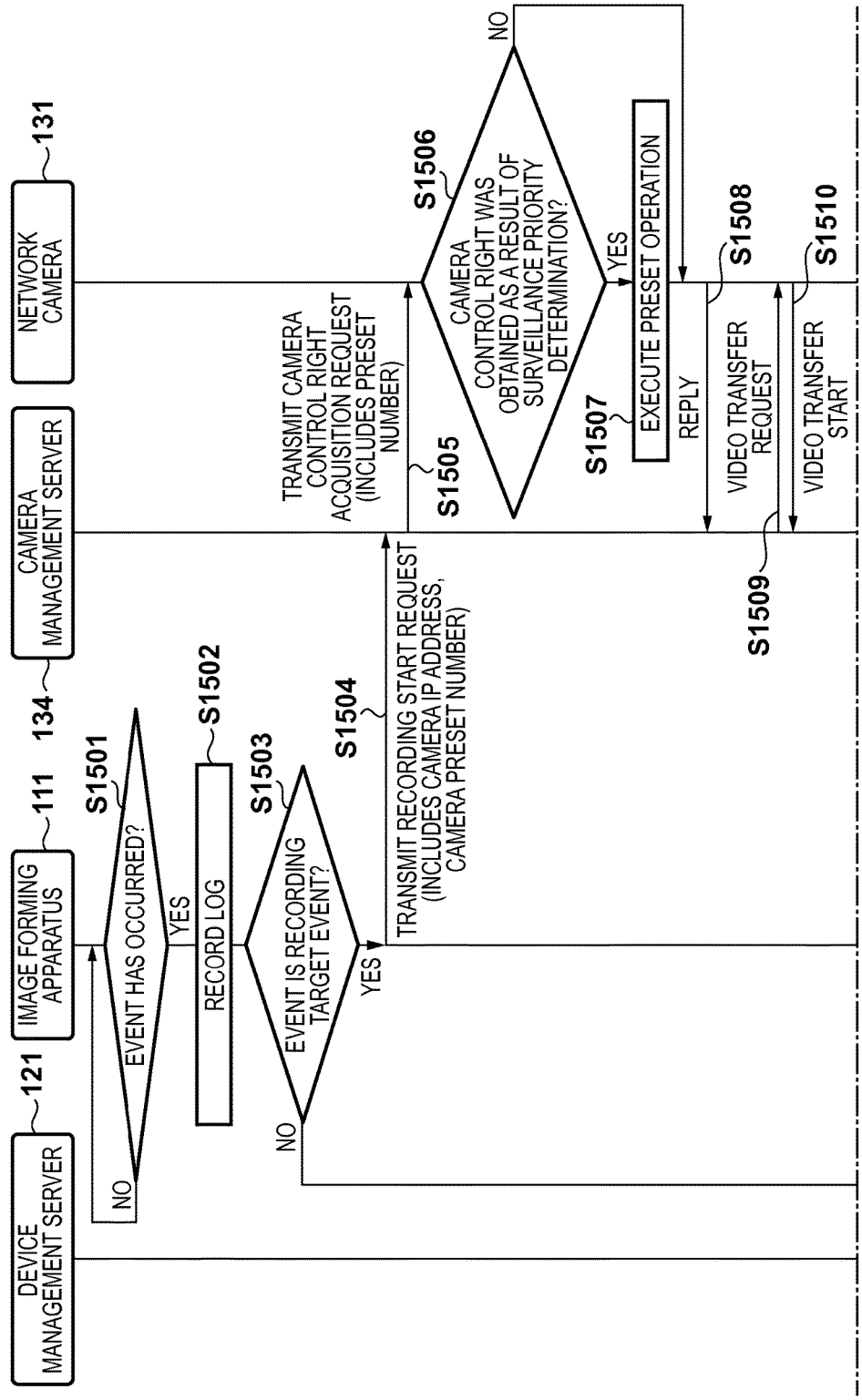

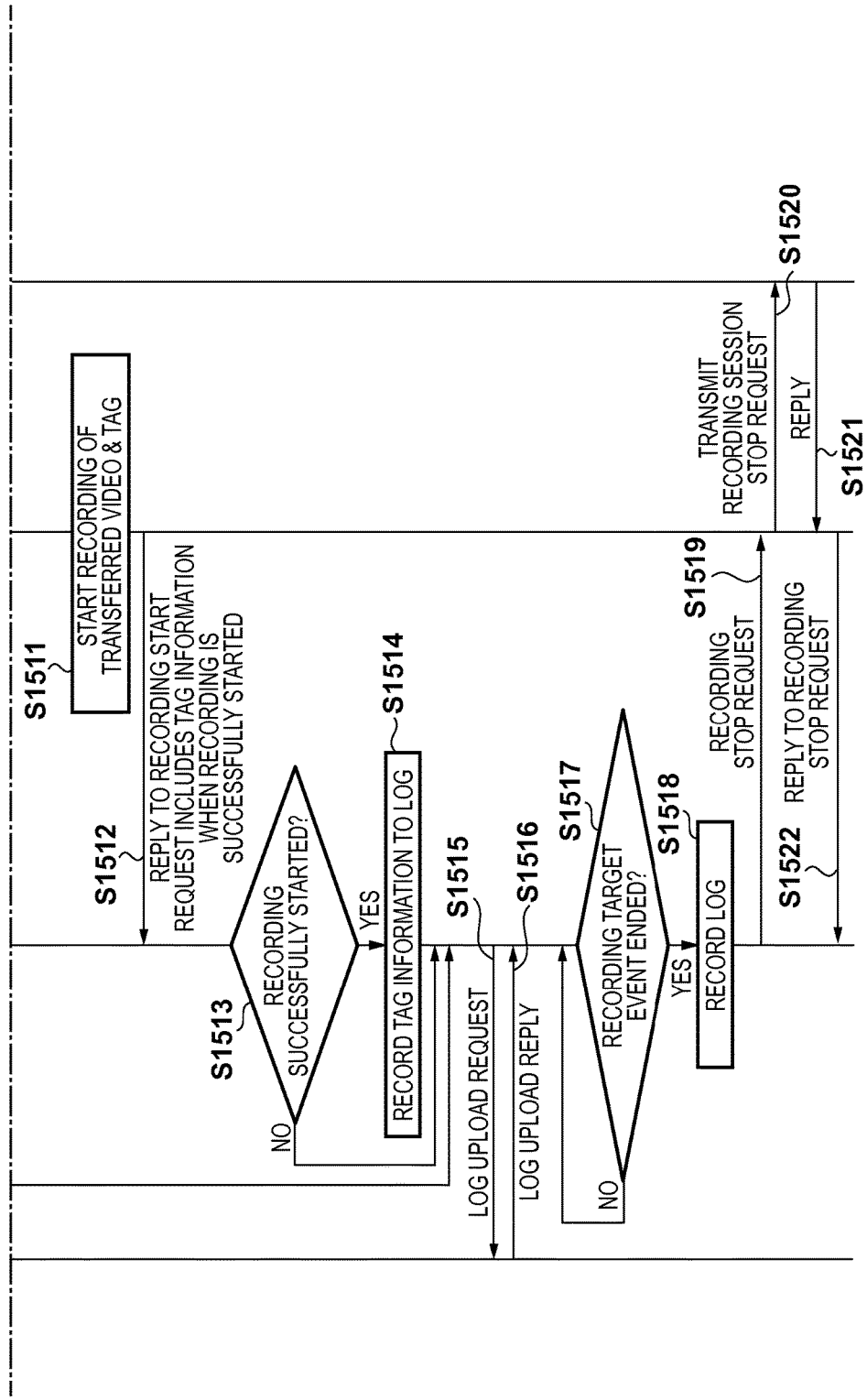

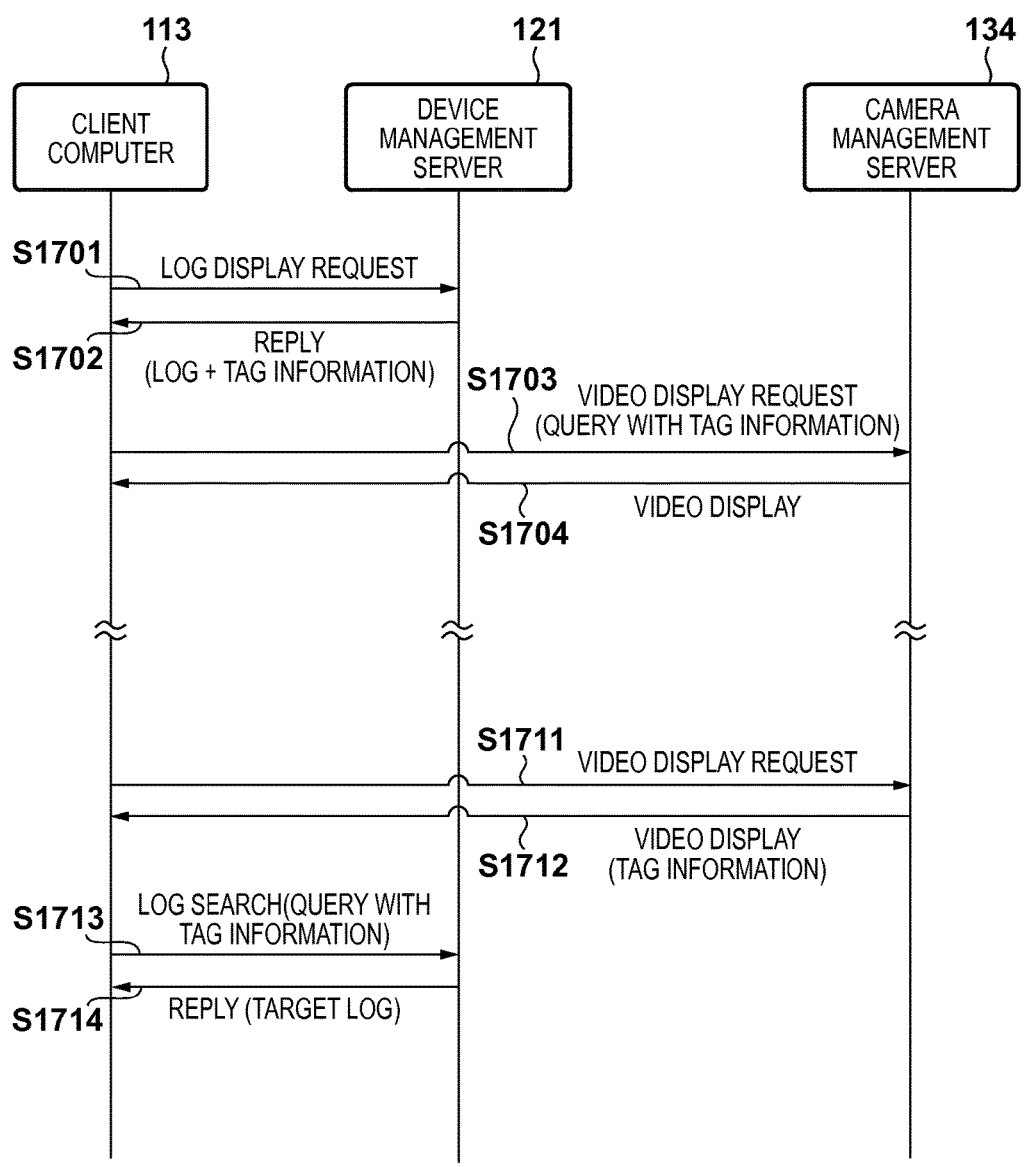

1800 ERROR NOTIFICATION LIST

1801

| DEVICE NAME | IP ADDRESS | STATUS | DATE-TIME OF OCCURRENCE | CAMERA VIDEO INFORMATION |
|---|---|---|---|---|
| C5000 | 192.168.1.101 | ERROR: E62001 | 2013/5/1 11:32 | VIDEO EXISTS: TAG INFORMATION [192.168.2.101/PresetNumber=7/20130501132237] |
| L3500 | 192.168.1.102 | OUT OF PAPER | 2013/4/25 15:12 | N/A |

1802

1810 RECORDING CAMERA: 192.168.2.101
VIDEO TAG INFORMATION: 192.168.2.101/PresetNumber=7/20130501132237

PLAYER — 1811

PLAYBACK POSITION: 00:34:23.000 — 1812
[REWIND] [▶PLAY] [■STOP] [FAST FORWARD]

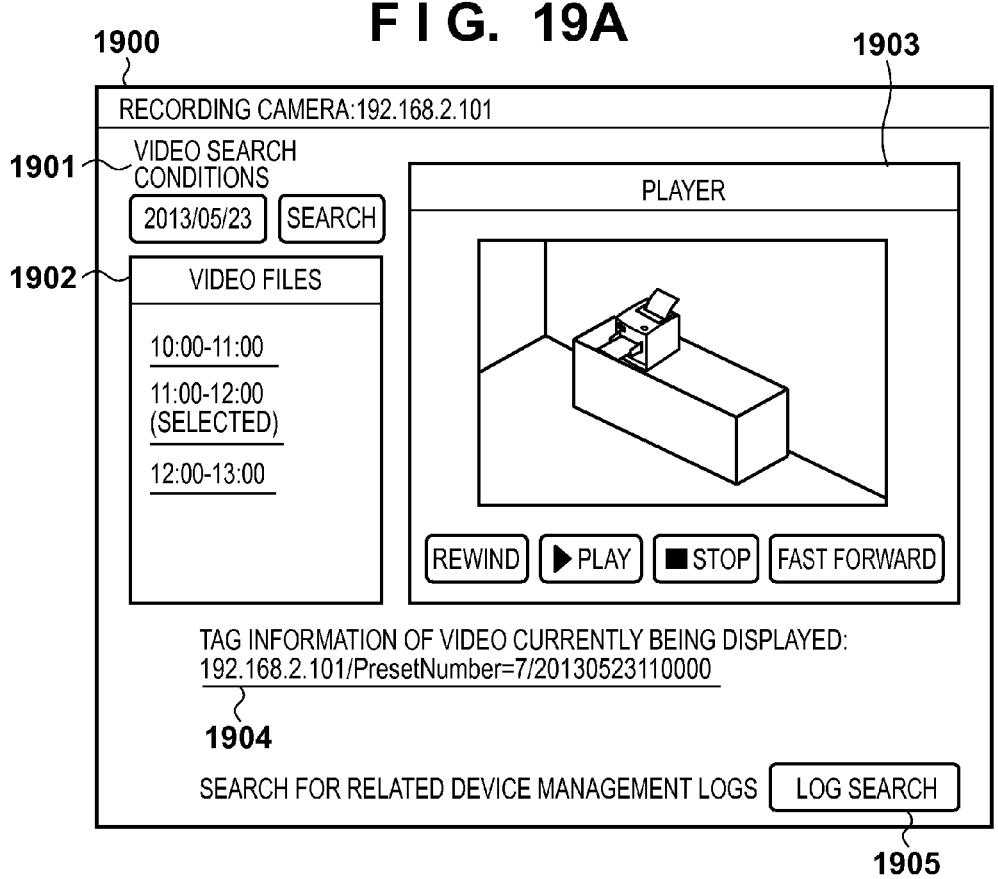

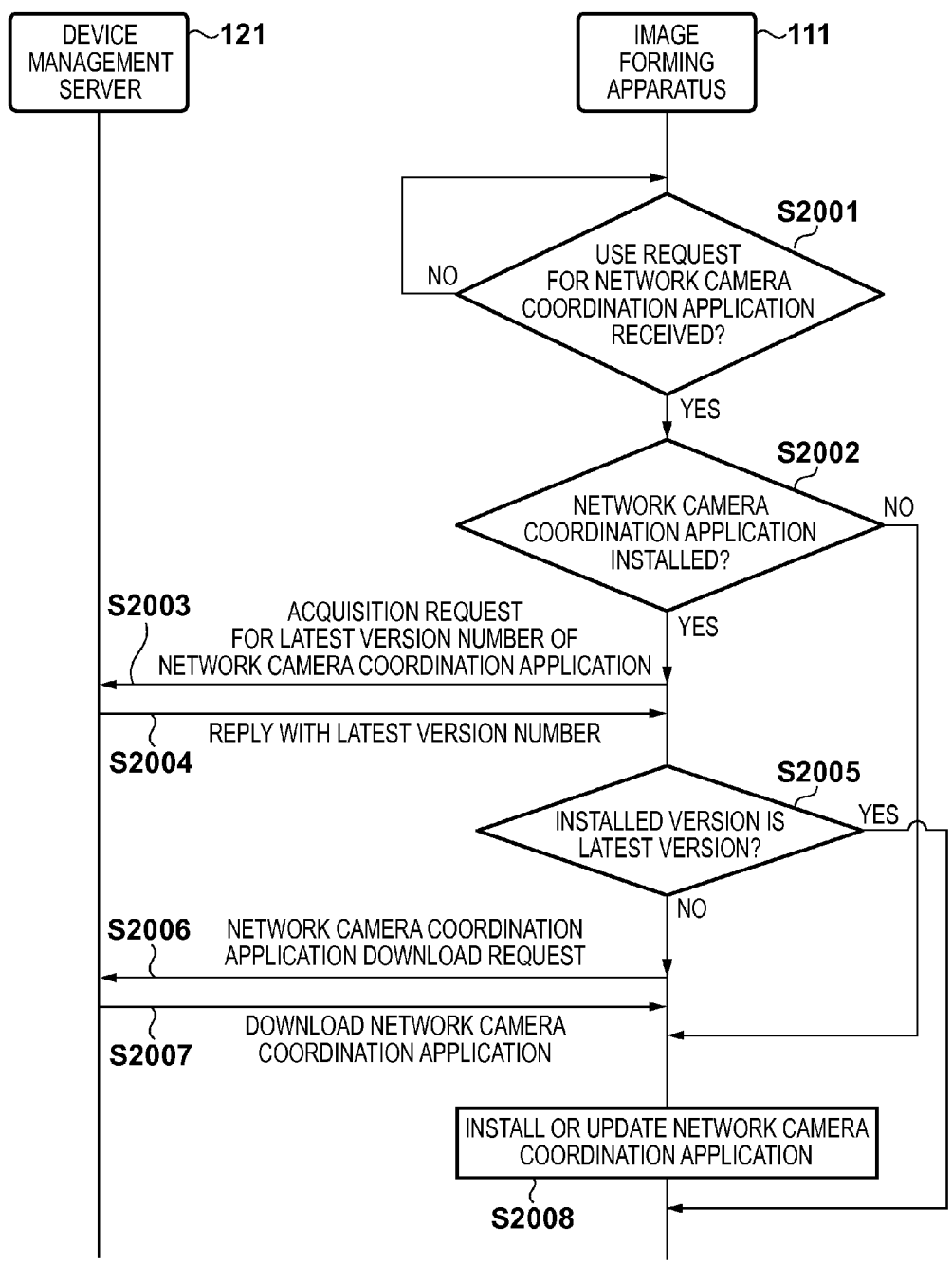

MANAGEMENT METHOD FOR NETWORK SYSTEM AND NETWORK DEVICE, NETWORK DEVICE AND CONTROL METHOD THEREFOR, AND MANAGEMENT SYSTEM

BACKGROUND OF THE INVENTION

Field of the Invention

The present invention relates to a method for managing a network system and a network device, and a network device and a control method therefor, and more particularly to a network system that coordinates with a network camera, and the like.

Description of the Related Art

Device management systems for managing image forming apparatuses such as business-oriented multi-function peripherals and printers have been provided. The object of these device management systems is to manage a list of image forming apparatuses that are installed and to have a handle on the utilization/operation status of each image forming apparatus. The image forming apparatuses record data on when a function was used, by whom and the extent of use as a job log for each of functions such as copy, scan and print. The device management system is able to provide a report relating to executed jobs, such as the proportion of color printing and the proportion of double-sided printing, by collecting and aggregating these job logs. Also, if an error occurs in an image forming apparatus, the device management system receives an error notification, and is thus able to get a handle on the operation status of the plurality of image forming apparatuses remotely in a centralized manner, and quickly carry out maintenance.

Meanwhile, surveillance and recording systems using network cameras have been provided for security applications and the like. Video taken by camera is recorded and stored as needed, and when a security-related problem occurs, current or past video can be checked or searched.

There are environments in which a network camera is introduced into an office as a measure against information leaks and the like, and actions such as removal of the output of image forming apparatuses from the office are monitored. In such an environment, conventionally the device management system and network camera are designed, built and operated as separate systems, and there is no means for associating events included in the log information of the image forming apparatuses with video taken by the network camera. In particular, since a network camera is generally built and operated as a closed network in order to transmit and receive large amounts of video data, coordinating with other systems or the like is comparatively difficult. Furthermore, since the video data of a network camera often includes privacy information about people and the like, coordinating with other systems on a public network such as the Internet is also problematic. Specifying video from events recorded in a log or, conversely, specifying events from video taken at the time is thus difficult given that neither a temporal association nor a geographical association is provided.

Japanese Patent Laid-Open No. 2007-104149 is given as an example of a conventional technology that allows an image forming apparatus to coordinate with a surveillance camera. Japanese Patent Laid-Open No. 2007-104149 discloses a method for using light emission signals to check whether an image forming apparatus targeted for surveillance exists in video, when monitoring an image forming apparatus with a surveillance apparatus. However, this conventional technology merely reveals whether a specific image forming apparatus is shown in the video, and is not able to associate events included in the log information of an image forming apparatus with video taken by a network camera.

SUMMARY OF THE INVENTION

The present invention has been made in view of the above conventional technology, and provides a means for coordinating a device management system with a network camera, such as a method for managing a network system and device, a network device and a control method therefor, and a computer program, for example.

According to one aspect of the present invention, there is provided a network system comprising a network device, a management system for managing the network device, a client, and a camera system, the network device including: a first acquisition unit that obtains identification information of a network camera that is included in the camera system from the camera system; a first transmission unit that transmits the obtained network camera identification information to the client; a second acquisition unit that obtains settings, configured in the client, that are based on an image captured by the network camera specified by the network camera identification information; and a second transmission unit that transmits the network camera identification information and the settings to the management system, and the management system including: a reception unit that receives the network camera identification information and the settings from the network device; and a management unit that manages the network camera identification information and the settings in association with identification information of the network device.

According to another aspect of the present invention, there is provided a network device that is managed by a management system, comprising: a first acquisition unit that obtains identification information of a network camera that is included in the camera system from the camera system; a first transmission unit that transmits the obtained network camera identification information to a client; a second acquisition unit that obtains settings, configured in the client, that are based on an image captured by the network camera specified by the network camera identification information; and a second transmission unit that transmits the network camera identification information and the settings to the management system which manages the network camera identification information and the settings in association with identification information of the network device.

According to the present invention, video and logs for monitoring an image forming apparatus can be associated with each other, enabling logs of the image forming apparatus and video of the image forming apparatus to be cross-referenced.

Further features of the present invention will become apparent from the following description of exemplary embodiments with reference to the attached drawings.

BRIEF DESCRIPTION OF THE DRAWINGS

FIG. 4A is a diagram showing a device management table.

FIG. 4B is a diagram showing network camera management table.

FIG. 5 is a diagram showing a job log record.

FIG. 6A is a diagram showing an error log record.

FIG. 6B is a diagram showing an operation log record.

FIG. 6C is a diagram showing a video tag information record.

FIG. 7A is a diagram showing a job log table.

FIG. 7B is a diagram showing an error log table.

FIG. 7C is a diagram showing an operation log table.

FIG. 8A is a diagram showing a camera option management table.

FIG. 8B is a diagram showing a recording target event management table.

FIG. 9 is a diagram showing a video tag information management table.

FIG. 10A is a diagram showing a preset settings management table.

FIG. 10B is a diagram showing a tag information management table.

FIGS. 11A and 11B are diagrams illustrating a flow for registering information on a network camera for capturing an image forming apparatus in a device management server.

FIGS. 12A and 12B are diagrams showing a device list screen and a camera setup screen.

FIG. 13 is a diagram illustrating processing for narrowing down camera candidates.

FIG. 14 is a diagram showing a network camera placement map screen.

FIGS. 15A and 15B are diagrams illustrating a flow for associating recorded video with the log of an image forming apparatus (1/2).

FIG. 17 is a diagram illustrating a flow for referencing associated camera video from the log of an image forming apparatus, and a flow for referencing the log of an image forming apparatus having tag information from camera video.

FIG. 19A is a diagram showing a video display screen.

FIG. 19B is a diagram showing an associated log search result display screen.

FIG. 20 is a diagram illustrating processing for installing/updating a network camera coordination application.

DESCRIPTION OF THE EMBODIMENTS

Configuration of Network System

Figure 1:
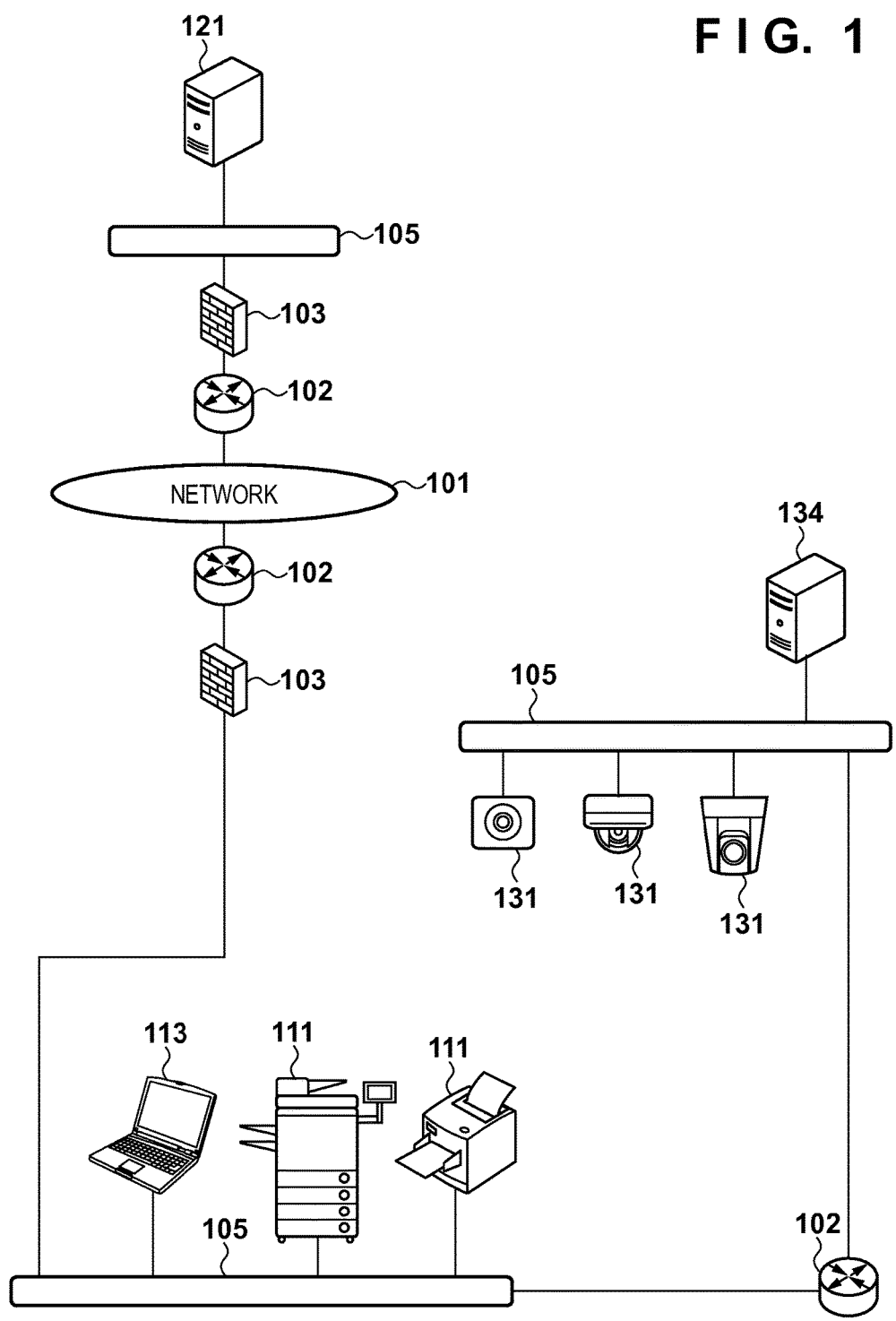
FIG. 1 is a diagram showing a system configuration and a network configuration for carrying out the present invention.

Hereinafter, preferred embodiments for carrying out the present invention will be described with reference to the drawings. FIG. 1 shows an exemplary configuration of a network system (or a device management system) for carrying out the present invention. A network 101 is a network such as the Internet or an intranet. Network devices 102 are routers, switches or the like that connect networks. Firewalls 103 control whether communication is permitted between networks. LANs (Local Area Networks) 105 are networks of terminals that connect devices such as computers, and may, in addition to being a wired communication network, also be a wireless communication network such as a wireless LAN or a mobile phone communication network. Image forming apparatuses 111 are apparatuses that form images on media, and types thereof include single function printers (SFP) and multi-function peripherals (MFP) provided with the multiple functions of a copier, scanner and printer. A client computer 113 is a computing device such as a personal computer, a tablet computer or a smart phone, and may also simply be referred to as a client. A device management server 121 records logs or the like of events that occur in the image forming apparatuses, and monitors the operating state and the like. That is, the device management server 121 functions as a management system that manages image forming apparatuses serving as network devices. Network cameras 131 operate under the management of a camera management server 134, and capture the place where image forming apparatuses or the like are installed and transmit video thereof to the camera management server 134. Types of network cameras 131 include fixed box-type, pan/tilt and wide-angled network cameras that are differentiated by the lens or operating mechanism. The camera management server 134 records video data, log data, and the like. The network cameras 131 and the camera management server 134 are also collectively called a camera system.

Module Configuration of Information Processing Function

Figure 2:
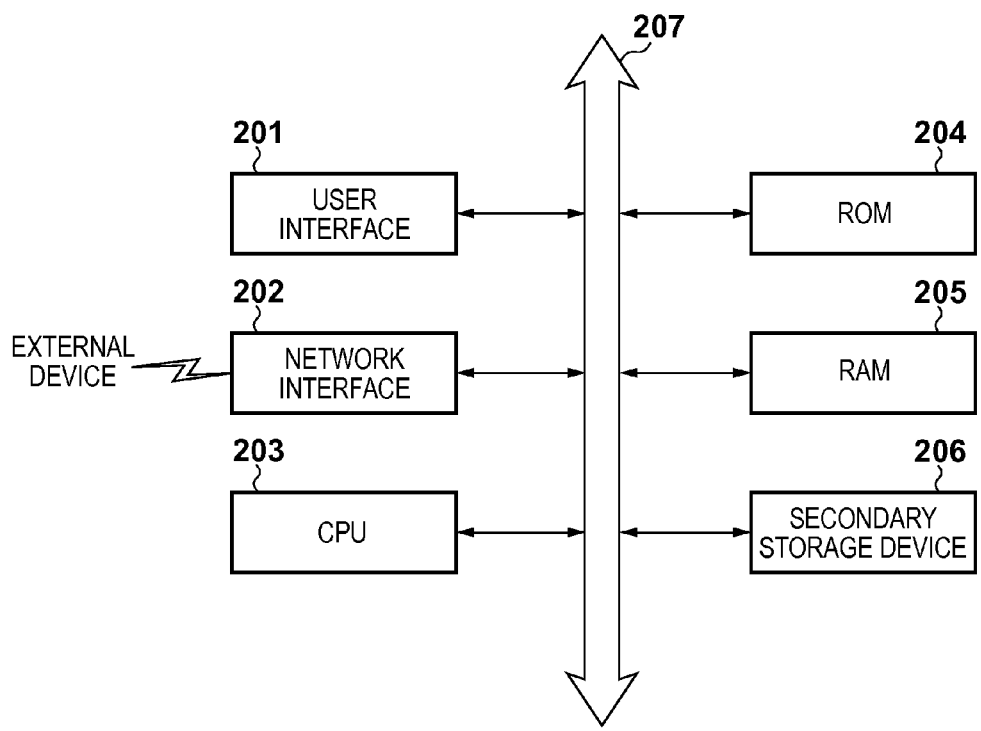
FIG. 2 is a block diagram of information processing function hardware.

FIG. 2 shows a module block diagram of the information processing function of the image forming apparatuses 111, the client computer 113, the device management server 121, the network cameras 131, and the camera management server 134. A user interface 201 performs input/output of information using a display, keyboard, mouse, touch panel or the like. A computer that is not provided with the above hardware can also be connected/operated from another computer, using a remote desktop, a remote shell or the like. A network interface 202 connects to a network such as a LAN, and performs communication with other computers and network devices. A ROM 204 is a ROM on which built-in computer programs and data are recorded. A RAM 205 is a RAM having a temporarily memory area. A secondary storage device 206 is a mass file storage that is typified by an HDD. A CPU 203 executes programs loaded from the ROM 204, the RAM 205, the secondary storage device 206, and the like. The individual units are connected via an input/output interface 207.

Software Configuration and Interconnection of the System

Figure 3:
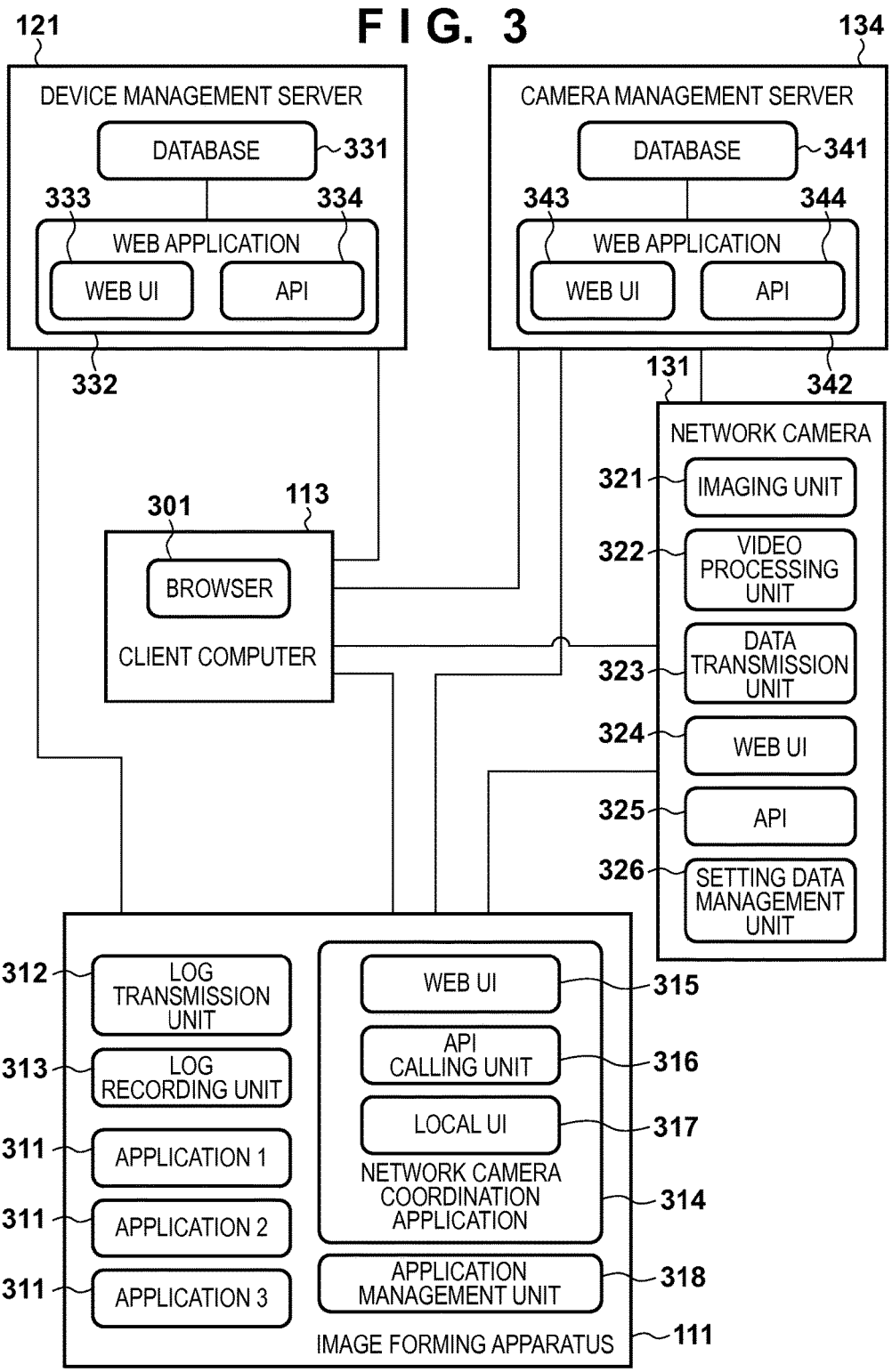
FIG. 3 is a diagram illustrating the software configuration and network interconnection of the system.

FIG. 3 shows a software configuration of the system and interconnection via networks. A database 331 is provided in the device management server 121, and holds data required by the respective functions of the device management server. A Web application 332 provides a Web user interface (hereinafter, Web UI) 333 and an application programming interface (hereinafter, API) 334. The Web application 332 processes requests from other devices through a network, accesses data in the database 331 as needed, executes various functions, and returns a reply.

A database 341 is provided in the camera management server 134, and holds data required by the respective functions of the camera management server 134. A Web application 342 provides a Web user interface (hereinafter, Web UI) 343 and an application programming interface (hereinafter, API) 344. The Web application 342 processes requests from other devices through a network, accesses data in the database 341 as needed, executes various functions, and returns a reply.

An imaging unit 321 of the network camera 131 obtains an image by controlling the lenses, image sensor, and the like of the camera. A video processing unit 322 performs processing on the raw image obtained by the imaging unit 321 and obtains video data or the like. Also, the video processing unit 322 performs additional processing such as image recognition and obtains additional information from the image or video. A data transmission unit 323 transmits the video data to other devices on the network. A Web UI 324 provides a viewer screen of the network camera and a management screen. On the viewer screen, the user is able to manipulate the orientation, zoom, focus and the like of the camera while checking the video taken by the camera. On the management screen, preset registration of the image capture position of the camera, specification of processing that is performed by the video processing unit 322, address registration of video data that is transmitted by the data transmission unit 323, and the like can be performed. An API 325 carries out operation of the camera, setting data registration and the like, as a result of requests from other devices. A setting data management unit 326 holds setting data for the imaging unit 321, the video processing unit 322, and the data transmission unit 323.

An application 311 is executed by the image forming apparatus 111. The application 311 is able to install a plurality of applications in the image forming apparatus 111 and execute the applications, according to the function and purpose thereof. These include applications for copying, scanning, printing and the like, for example. A log recording unit 313 records and stores logs such as a job log, an error log and an operation log, in accordance with requests from the application 311. A log transmission unit 312 transmits logs recorded by the log recording unit 313 to the device management server 121. Reference numeral 314 denotes a network camera coordination application. The network camera coordination application 314 is provided with a Web UI 315, an API calling unit 316, and a local UI 317. The API calling unit 316 calls the API 334 of the device management server 331, the API 344 of the camera management server 134 and the API 325 of the network camera 131, and executes required processing. The local UI 317 provides an operation screen for operating the network camera coordination application to the user interface 201 of the image forming apparatus 111. An application management unit 318 manages or controls installing, uninstalling, starting, stopping and the like of the applications in the image forming apparatus 111.

A browser 301 is installed on the client computer 113, and accesses the respective Web UIs of the aforementioned devices and provides operations and display of screens for executing various functions.

Configuration of Various Tables

FIGS. 4A and 4B are illustrative diagrams showing various tables in the database 331 of the device management server 121 and in the database 341 of the camera management server 134. A device management table 400 in FIG. 4A is a table in the database 331 for managing a plurality of image forming apparatuses 111. In the device management table 400, Device Serial ID 401 is a column storing the device serial ID of the image forming apparatus 111. IP Address 402 is a column storing the IP address of the image forming apparatus 111. Manufacturer Name 403 is a column storing the name of the manufacturer. Model Name 404 is a column storing the model name. Device Type 405 is a column storing the type of device such as MFP, SFP or the like. Color Classification 406 is a column storing a color classification representing whether the image forming apparatus 111 has color printing capability or monochrome printing capability. Installation location 407 is a column storing installation location information of the image forming apparatus. The device serial IDs 401 are unique IDs identifying the individual image forming apparatuses. An device serial ID is allocated to each individual image forming apparatus at the time of manufacture and recorded in a nonvolatile storage area in a manner that allows the image forming apparatuses themselves to subsequently read out their own device serial ID. If the device serial ID is known, required information registered in the device management table 400 such as the model name of the image forming apparatus, can be specified, with reference to the device information management table 400. An image forming apparatus 111, at the time of being registered for management by the device management server 121, transmit the information of the columns 401 to 407 relating to itself, and the device management server 121 adds a record to the device management table 400.

A network camera management table 410 in FIG. 4B is a table in the database 341 for managing a plurality of network cameras 131. In the network camera management table 410, IP Address 411 is a column for storing an IP address, which is connection information for connecting to the network camera 131. Manufacturer Name 412 is a column storing the name of the manufacturer. Model Name 413 is a column storing the model name. Camera Type 414 is a column storing the type of camera such as pan/tilt, wide-angled or fixed box-type. Camera Name 415 is a column storing the camera name, which is identification information set for each of the network cameras 131. Installation Location 416 is a column storing installation location information for each of the network cameras 131.

Configuration of Log Record

FIG. 5 and FIGS. 6A to 6C are diagrams showing the records of various logs that are recorded in the log recording unit 313 of the image forming apparatuses 111. A job log record 500 is one record of a log that records history information of jobs that are executed by the image forming apparatus 111. In the job log record 500, Job ID 501 is a column storing a job ID which is a unique ID for each image forming apparatus. Start Date-Time 502 is a column storing the start date and time of the job. End Date-Time 503 is a column storing the end date and time of the job. Job Name 504 is a column storing the job name. Job Executor 505 is a column storing the name, user ID or the like of the executor of the job. Job Exit Code 506 is a column storing the exit code of the job. By determining the exit code, the exit state of the job, such as normal end, abnormal end, canceled after start, and the like can be checked. Job Type 507 is a column storing the type of job such as copy, scan or print. Advanced Settings 508 are various columns for storing more detailed information about each job.

An error log record 600 in FIG. 6A is one record of a log that records history information of errors that have occurred in an image forming apparatus. In the error log record 600, Error ID 601 is a column storing an error ID which is a unique ID for each image forming apparatus. Start Date-Time 602 is a column storing the start date and time of the error. End Date-Time 603 is a column storing the end date and time of the error. Error Level 604 is a column storing an error level representing the severity of the error. Error Code 605 is a column storing an error code for identifying the type of error. Location 606 is a column storing the location where the error occurred.

An operation log record 610 in FIG. 6B is one record of a log that records history information of operations performed on an image forming apparatus. In the operation log record 610, Event ID 611 is a column storing an event ID which is a unique ID for each image forming apparatus.

Event Date-Time 612 is a column storing the date and time on which the event occurred, that is, the date and time on which the operation was performed. User ID 613 is a column storing the user ID of the user who performed the operation. Operation Code 614 is a column storing an operation code for identifying the type of operation. Operation Content 615 is a column storing the content of the operation.

A video tag record 620 in FIG. 6C is a record that records video tag information. Log ID 621 is a column storing an ID recorded in the log, such as the job ID, error ID or event ID of the various logs. Video Tag Information 622 is a column storing video tag information associated with the ID. A video tag is tag information associated with a video file and a specific location in the video.

Various Tables in Database 331

FIGS. 7A to 7C, FIGS. 8A to 8B and FIG. 9 are diagrams illustrating examples of various tables in the database 331. In FIG. 7A, a job log table 700 is a job log table that registers job log records received from the image forming apparatuses 111. Device Serial ID 701 is a column for storing the device serial ID of the image forming apparatus 111 that transmitted the job log record. Columns 702 to 708 are columns in which the values of the columns 501 to 507 of the job log record 500 are stored.

An error log table 710 shown in FIG. 7B is an error log table that registers error log records received from the image forming apparatuses 111. Device serial ID 711 is a column for storing the device serial ID of the image forming apparatus 111 that transmitted the error log record. Columns 712 to 717 are columns in which the values of the columns 601 to 606 of the error log record 600 are stored.

An operation log table 720 shown in FIG. 7C is an operation log table that registers operation log records received from the image forming apparatuses 111. Device Serial ID 721 is a column for storing device serial ID of the image forming apparatus 111 that transmitted the operation log record. Columns 722 to 726 are columns in which the values of the columns 611 to 615 of the operation log record 610 are stored. Note that the job log, the error log and the operation log may be collectively referred to as event logs. Similarly, the job log table, the error log table and the operation log table may be collectively referred to as event log tables.

The image forming apparatuses 111 call the API 334 of the device management server 121 from the log transmission unit 312, and transmit the various log records 500, 600 and 610. The Web application 332 stores the received log records in the respective tables 700, 710 and 720 of the database 331. The device management server 121 thereby manages operation states of a plurality of image forming apparatuses 111 from past to present. For example, a device management function can be provided that aggregates job logs and reports job usage trends or notifies a warning through display when an error log is received.

In FIG. 8A, a camera option management table 800 is a camera option management table for managing camera information on network cameras associated as surveillance cameras for each image forming apparatus. Device Serial ID 801 is a column storing the device serial ID of the image forming apparatus 111. Network Camera IP Address 802 is a column storing the IP address of the network camera 131. Network Camera Preset Information 803 is a column storing preset information of the network camera 131. Preset information is a group of set values that have been set in advance (settings) among the settings of the cameras, and, includes the direction of the camera, the focal length and the like, for example. Surveillance Level 804 is a column storing the level of surveillance of the image forming apparatus by the camera. The surveillance level shows the level of surveillance possible by the camera. A recording target event management table 810 shown in FIG. 8B is a recording target event management table for holding and managing predetermined events that are targeted for recording. Log Type 811 is a column storing the log type of the event targeted for recording. Job Type/Error Code/Operation Code 812 is a column storing the job type, error code or operation code of the event targeted for recording. When a job of that job type, an error having that error code or an operation having that operation code occurs, video from the camera is recorded.

A video tag information management table 900 shown in FIG. 9 is a video tag information management table for managing jobs, errors and events in association with video. Device Serial ID 901 is a column storing the device serial ID of the image forming apparatus 111. Log Type 902 is a column storing the log type. Job ID/Error ID/Event ID 903 is a column storing the job ID, error ID or event ID. Video Tag Information 904 is a column storing video tag information associated with the ID.

Tables in Setting Data Management Unit 326 and Database 341.

FIGS. 10A and 10B are diagrams respectively illustrating tables in the setting data management unit 326 and the database 341. A preset settings management table 1000 shown in FIG. 10A is a preset settings management table in the setting data management unit 326. Preset Number 1001 is a column storing a number of the preset. Preset Name 1002 is a column storing the name of the preset. Pan 1003, Tilt 1004 and Zoom 1005 are columns respectively storing set values for pan, tilt and zoom of the camera. Focus Mode 1006 is a column storing a set value of the focus mode (auto/manual, etc.) of the camera. Surveillance Priority 1007 is a column storing a surveillance priority. Each network camera 131 can hold a plurality of preset settings, and when the number of a preset is specified and a preset setting is called as needed, the camera is able to operate in the manner set in advance as the preset setting. This preset setting/call function can be used if the user wants to capture a plurality of locations with one camera, or if the user wants to use a digital zoom function to zoom in and capture a portion of video taken by a wide-angled camera.

A tag information management table 1010 shown in FIG. 10B is a table in the database 341 for associating video tag information with a video file and a specific section thereof. Tag Information 1011 is a column storing tag information of the video file. Video File Path 1012 is a column storing the file path of the tagged video file. Timeline Information 1013 is a column storing timeline information of the video file. The time shown by the timeline information 1013 in the video files saved to the video file path is the point tagged by the tag 1011.

Camera Information Registration Flow

FIGS. 11A and 11B are diagrams illustrating a flow according to which the user uses the client computer 113 to specify a network camera 131 for capturing an image forming apparatus 111 and register camera information in the camera option management table 800 of the image forming apparatus 111. FIGS. 12A and 12B are diagrams illustrating a user interface screen 1200 and a user interface screen 1210 that are provided by the Web UIs 333, 343, 324 and 315 of the device management server 121 in the procedure of FIGS. 11A and 11B.

First, the user operates the local UI 317 of the image forming apparatus 111, and activates the camera setup mode (S1101). The API calling unit 316 of the image forming apparatus 111 calls the API 334 of the device management server 121, and notifies the device serial ID of the image forming apparatus 111 and the change to camera setup mode to the device management server 121 (S1102). The API 334 of the device management server 121 returns a reply to the API calling unit 316 when the notification of the change to the camera setup mode is received (S1103).

Next, the user operates the browser 301 of the client computer 113 to access the Web UI 333, and requests display of a device list screen 1200 (S1104). The Web UI 333 returns a reply to the display request and the browser 301 displays the device list screen 1200 (S1105). At this time, the fact that the camera setup mode is set is displayed in Mode 1201 on the device list screen 1200, in a manner that enables the image forming apparatus that is in the camera setup mode to be distinguished from among the plurality of image forming apparatuses. A camera option setting start button 1202 is a URL link of the Web UI 315 of the image forming apparatus 111. When the user presses the setting start button 1202 (S1106), the browser 301 is redirected to the URL of the Web UI 315, and displays a camera setup screen 1210 (S1107).

The API calling unit 316 of the image forming apparatus 111 calls the API 334 of the device management server 121, and obtains the IP address or the host name of the camera management server 134 that has been set in advance in the device management server 121 (S1108, S1109). The API calling unit 316 calls the API 344 of the camera management server 134, and transmits a camera list acquisition request (S1110). The Web application 342 of the camera management server 134 obtains a camera list from the network camera management table 410 in the database 341, and replies to the API calling unit 316 of the image forming apparatus 111 (S1111). The Web UI 315 displays the obtained camera list in a camera list display field 1211 (S1112). A narrow down button 1212 is a button for instructing narrowing down of the number of candidate cameras that are capable of capturing the image forming apparatus 111 that is in the camera setup mode from among all the cameras in the network camera management table 410. This narrowing down processing will be described using separate diagram.

The camera list display field 1211 of the camera setup screen 1210 displays camera names 415, and provides a link to the IP address of each camera. When the link to a specific camera is selected from the camera list display field 1211 (S1113), the browser 301 accesses the Web UI 324 of the selected network camera 131, obtains a camera viewer screen, and displays the obtained camera viewer screen in a camera viewer display field 1213 (S1114, S1115). An image captured by the selected camera and an operation button that depends on the degree of freedom of operations such as pan, tilt and zoom, for example, of the camera are displayed on the camera viewer screen. The user operates the camera viewer display field 1213, and adjusts the angle of view, direction and the like of the camera that is able to favorably capture the image forming apparatus 111 targeted for surveillance (S1116). Operation of this operation button is notified to the imaging unit 321 via the API 325 of the network camera 131, and the network camera 131 drives the zoom mechanism and/or camera platform according to the operation. Also, the image captured by the camera may be updated by being obtained at fixed intervals or whenever the camera is operated. Furthermore, the surveillance level and the surveillance priority can be set as additional option information. The surveillance level is, as shown in a surveillance level setting field 1214, set as an index indicating how favorably the image forming apparatus targeted for surveillance is shown in the video taken by the camera. Depending on the installation position of the camera and image forming apparatus, there may conceivably be cases where blind spots exist or sufficient resolution is not obtained. By being able to get a handle on how favorably the image forming apparatus 111 can be monitored by the network camera 131, use cases where control of the image forming apparatus is changed depending on the surveillance level are thereby realizable. Also, the surveillance priority is set, as shown in a priority setting field 1215, if a plurality of image forming apparatuses have to be supervised with one camera. This priority setting enables the camera to be controlled to record video of the image forming apparatus having a higher priority, if acquisition requests for video of a plurality of image forming apparatuses are received by one camera at the same time. Finally, when a preset registration button 1216 is pressed (S1117), the API calling unit 316 calls a preset setting API with respect to the API 325, using the name of the preset and the surveillance priority as parameters (S1118). The setting data management unit 326 adds a new record to the preset settings management table 1000, respectively sets the preset name 1002, the setting values of 1003 to 1006 set on the camera viewer, and the surveillance priority 1007, and sends back the number of the preset (S1119). Next, the API calling unit 316 calls the API 334 of the device management server 121, and notifies the device serial ID, the IP address of the camera that executed the preset setting, the number of the preset, and the surveillance level (S1120).

The Web application 332 adds a record to the camera option management table 800 in the database 331, and saves the received values in the columns 801 to 804 (S1121, S1122).

The Web UI 315 notifies the completion of setting to the browser 301 (S1123). In the case of selecting and registering two or more cameras for the same image forming apparatus 111, the processing from steps S1113 to S1123 is performed as described above (S1124).

Flow for Narrowing Down Camera Candidates

FIG. 13 is a diagram illustrating the flow for semi-automatically narrowing down the number of camera candidates that are capable of capturing the image forming apparatus that is in the camera setup mode in step S1112 of FIG. 11A with the narrow down button 1212 of FIG. 12B.

Pressing down the narrow down button 1212 of FIG. 12B (S1301) triggers the start of processing. The browser 301 transmits a narrowing down request to the Web UI 315 of the image forming apparatus 111 (S1302). The network camera coordination application 314 executes narrowing down processing (S1303). The Web UI 315 replies to the browser 301 with a list of camera candidates resulting from the narrowing down (S1304). The browser 301 displays the received list of camera candidates in the camera list display field 1211.

Three processing methods are given as examples of the narrowing down processing of step S1303. The first narrowing down processing involves the API calling unit 316 calling the API 344 of the camera management server 341, and retrieving the camera name 415 and the installation location information 416 in the network camera management table 410, with the installation location information 407 of the image forming apparatus 111 (S1311). The Web application 342 searches the network camera management table 410 of the database 341, and, if the relevant record exists, replies to the API calling unit 316 with a candidate camera list (S1312). This narrows down the candidate cameras, with the installation position of the image forming apparatus 111 and the network camera 131 as the common item.

The second narrowing down processing involves narrowing down the candidate cameras, utilizing the camera video that is being received by the camera management server 134. The camera management server 134 is provided with a function of analyzing received camera video as an additional function. 2D or 3D model data is provided and an image or object that is similar thereto is detected from the video. The image forming apparatus 111 knows its own model name 404, and thus is able to detect an image forming apparatus having the same model name as its own from the video if provided with model data matching its own model name as a detection condition. Applying this method, the API calling unit 316 calls the API 344 and transmits a search request with model data matching its own model name as a detection condition (S1321). The Web application 342 analyzes the video received from the current camera and the latest recorded video, lists cameras that are highly likely to include the model data serving as the detection condition, and replies to the API calling unit 316 with the list (S1322). This narrows down the camera candidates that could possibly be capturing the image forming apparatus 111 as video.

The third narrowing down processing utilizes a camera placement map. FIG. 14 is a diagram showing a network camera placement map. A network camera placement map screen 1400 is a screen for operating a map showing the placement of network cameras provided with the Web UI 343. First, the Web UI 315 redirects the request from the browser 301 to the camera placement map screen (S1331). The browser 301 transmits a map list screen display request to the Web UI 343 (S1332). The Web UI 343 replies to the browser 301 with a map list screen 1401 (S1333). The user selects a map from the map list screen 1401 (S1334). The browser 301 transmits a camera placement map screen display request for the selected map to the Web UI 343 (S1335). The Web UI 343 replies to the browser 301 with a camera placement map 1402 (S1336). A camera list 1403 is a list of cameras whose placement position is displayed in the camera placement map 1402. The user marks the checkbox of cameras to be selected from this list (S1337), and presses the narrow down button 1404 (S1338). This narrows down the camera candidates for capturing the target image forming apparatus 111 from the camera placement map.

The above procedure results in camera information being registered in the camera option management table 800 of the image forming apparatus 111.

Flow for Associating Video and Events by Event Drive

FIGS. 15A and 15B are diagrams illustrating the flow for transmitting a recording request to the camera management server 134 triggered by occurrence of an event in an image forming apparatus 111, and associating recorded video with the log of the image forming apparatus. In other words, FIGS. 15A and 15B show a procedure for associating an event-driven log with recorded video. The occurrence of an event of some sort in an image forming apparatus 111 (S1501) triggers the log recording unit 313 to record a record in the job log 500, the error log 600 or the operation log 610 (S1502). The log recording unit 313 downloads information of the recording target event management table 810 from the API 334 of the device management server 121 in advance, and determines whether the event that occurred matches an event targeted for recording (S1503). If the determination is No, the processing advances to step S1515. If the determination is Yes, the API calling unit 316 calls the API 344 and transmits a recording start request using camera IP addresses registered in the camera option management table 800 and the preset number (S1504). The Web application 342 of the camera management server 134 calls the API 325 of the network camera 131, specifies a preset number, and transmits a camera control right acquisition request for a network camera 131 (S1505).

The network camera 131 determines whether the surveillance priority of the requested preset number is higher than the surveillance priority of the preset number currently being used, with reference to the preset settings management table 1000 (S1506). If the current control right was not obtained or the requested preset number has a higher surveillance priority, a preset operation registered for the requested preset number is executed (S1507). The network camera 131 returns a reply to the Web application 342 showing whether the camera control right was obtained in response to the camera control right request (S1508).

The Web application 342 transmits a video transfer request to the API 325 of the network camera 131 (S1509). The data transmission unit 323 starts transfer of video from the camera to the Web application 342 (S1510). The Web application 342 executes recording of video by saving the received video to storage or the like (S1511). Also, the Web application 342 tags the video at this point in time by saving a record of tag information in the tag information management table 1010 at this time. The API 344 returns a reply to the recording start request to the API calling unit 316 (S1512). At this time, the reply includes the aforementioned tag information 1011 if the recording start is successful.

If the recording start request is successful, the log recording unit 313 adds a video tag record 620, and records one of the job ID, the error ID and the event ID in the ID 621 and the received video tag information in the video tag information 622 (S1513, S1514). If two or more pieces of camera information are registered in the camera option management table 800 with respect to the device serial ID of the image forming apparatus 111, the processing from step S1504 to S1514 is executed for each camera. The log transmission unit 312 uploads the updated record of the job log 500, the error log 600 or the operation log 610 to the API 334 (S1515, S1516). If the job ID, error ID or event ID of the updated record also exists in the video tag information record 620, the video tag information record is also uploaded.

The Web application 332 receives the record uploaded from the image forming apparatus 111, and saves the received record in the job log table 700, the error log table 710 or the operation log table 720 and in the video tag information management table 900. The timing at which these updated records are uploaded can be adjusted such that logs having a high degree of urgency such as the error log are uploaded immediately after an event has occurred, whereas the job log, operation log and the like are uploaded periodically.

If the recording target event has ended, the image forming apparatus 111 records the event to the job log 500, the error log 600, or the operation log 610 (S1517, S1518). The API calling unit 316 calls the API 344 and transmits a recording stop request (S1519).

The Web application 342 of the camera management server 134 calls the API 325, and requests a recording session stop (S1520). The API 325 stops transfer of video and returns a reply (S1521). The API 344 returns a reply to the recording stop request to the API calling unit 316 (S1522).

With the above procedure, occurrence of an event in the image forming apparatus 111 triggers recording of video by the network camera that is monitoring the image forming apparatus 111, enabling the event to be associated with the video.

Flow for Associating Events with Video being Recorded

Figure 16:
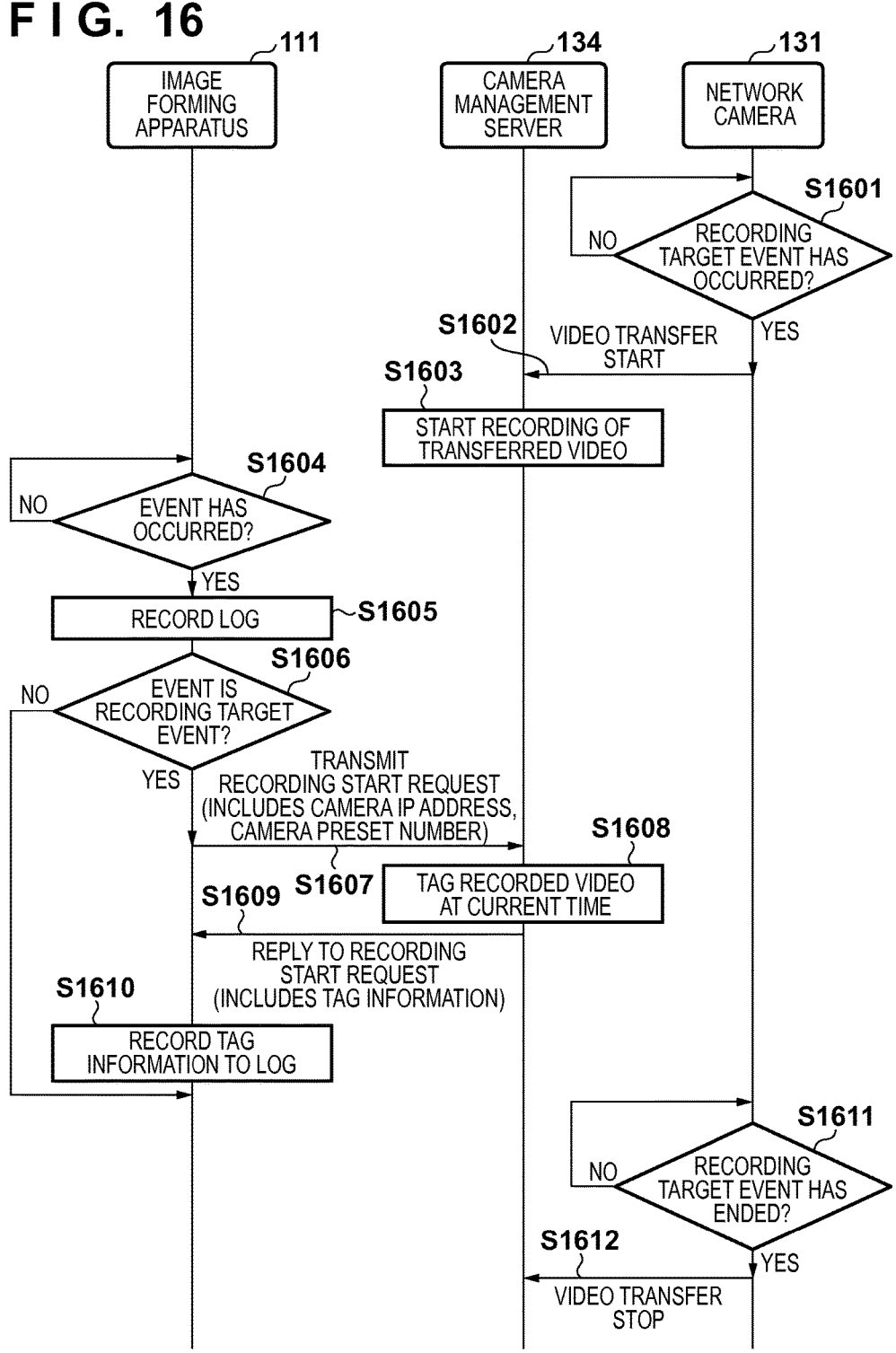
FIG. 16 is a diagram illustrating a flow for associating recorded video with the log of an image forming apparatus (2/2).

FIG. 16 is a diagram illustrating a flow in which a network camera 131 start recording when the video processing unit 322 detects an event in video that is being captured, and further tags the recorded video at the time when the event occurred in the image forming apparatus 111. The video processing unit 322 detects an event from video that is currently being captured, and determines whether the detected event is a recording target event (S1601). If the detected event is a recording target event, transfer of video to the API 344 is started (S1602). The Web application 342 of the camera management server 134 starts recording of video by saving received video to storage or the like. (S1603).

Thereafter, when an event occurs in the image forming apparatus 111, the log recording unit 313 first records a record to the job log 500, the error log 600 or the operation log 610 (S1604, S1605). The log recording unit 313 determined whether the event that has occurred is a recording target event, similarly to step S1503 (S1606). If the event that has occurred is a recording target event, the API calling unit 316 calls the API 344 and transmits a recording start request (S1607).

Since recording has already started, the camera management server 134 adds a record for the video file being recorded to the tag information management table 1010, and tags the video at this time (S1608). The API 344 returns a reply to the recording start request that includes tag information to the API calling unit 316 (S1609).

The log recording unit 313 records tag information to the video tag information record 620, similarly to step S1514 (S1610). The network camera 131 stops transfer of video to the API 344 when the recording target event ends (S1611, S1612). Note that the log may be uploaded to the device management server 121 as in steps S1515 and S1516 in FIG. 15B, after step S1610.

Note that the procedure of FIG. 16 is applicable even if recording of video in step S1603 of FIG. 16 is started at step S1511 in FIG. 15B. For example, steps S1605 to S1610 of FIG. 16 are executed when a new event occurs while waiting for the end of a recording target event at step S1517 of FIG. 15B, and a plurality of events are associated with the same video.

The above procedure enables an event that occurs during recording of video to be recorded in association with the video that is being recorded.

Flow for Referencing Video from Logs and Referencing Logs from Video

Figures 18A, 18B:
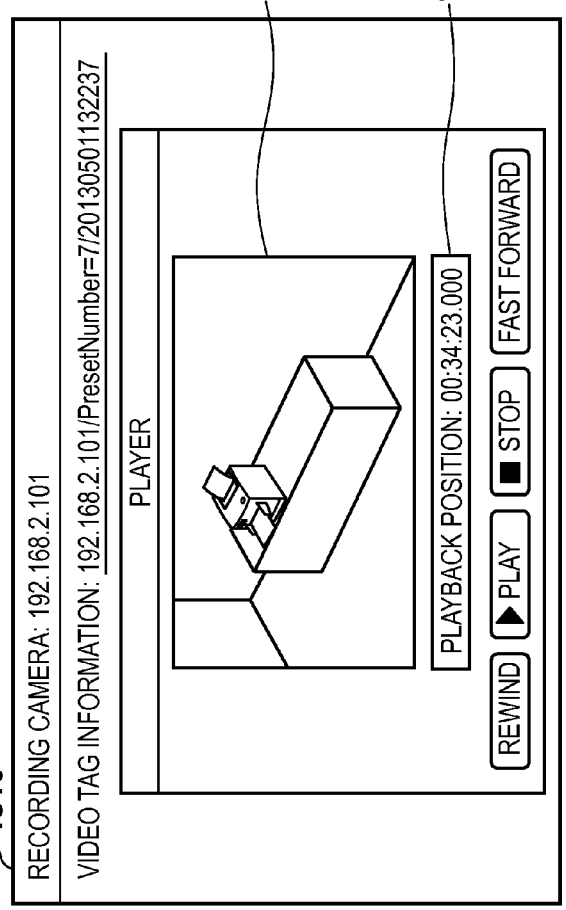
FIG. 18A is a diagram showing an error notification list screen.
FIG. 18B is a diagram showing a video display screen.

FIG. 17 is a diagram illustrating a flow, at the time of referencing a log of the image forming apparatus 111 saved by the device management server 121, for referencing recorded video of a network camera associated with the log. FIGS. 18A and 18B respectively show a log reference screen 1800 of an image forming apparatus and a reference screen 1810 for referencing recorded video of a network camera associated with a selected log. Also, FIG. 17 is a diagram illustrating a flow, at the time of referencing recorded video of a network camera with the camera management server 134, for referencing a log of an image forming apparatus 111 that has tag information tagged to the recorded video. FIGS. 19A and 19B are diagrams respectively showing a reference screen 1900 for referencing recorded video of a network camera, and a reference screen 1910 for referencing a log of an image forming apparatus that has the tag information tagged to the recorded video.

The flow in FIG. 17 in which recorded video of a network camera 131 that is associated with a log of an image forming apparatus 111 is referenced from the log will be described first. The browser 301 transmits a log display request to the Web UI 333, in response to an operation by the user, for example (S1701). The log display request includes specification of the type and timeframe of the log, the image forming apparatus, and the like, for example, as search conditions. Note that any of the fields in the log tables can be used as a search target.

The Web UI 333 of the device management server 121 searches the job log table 700, the error log table 710 or the operation log table 720 based on the specified conditions, and, if target logs are successfully retrieved, replies to the browser 301 with a list of logs (S1702). Also, the Web UI 333 searches the video tag information management table 900, and, if there is a record in which the device serial ID, log type and event ID match the log having video tag information, that is, the retrieved log, also replies with the video tag information.

The log display screen 1800 shown in FIG. 18A illustrates an example in which an error log list is displayed, if error logs, for example, are received at step S1702. Video tag information 904 is displayed as a link 1802 in a column 1801 of camera video information, with respect to the log having video tag information. The link 1802 is a link to the Web UI 343. A video display request is transmitted to the Web UI 343 with video tag information as a search condition, when the link 1802 is pressed (S1703).

The Web application 342 searches the tag information management table 1010, obtains a record having the relevant tag information in the column 1011, specifies a video file from the video file path 1012, and replies to the browser 301 with a video display screen (S1704).

The browser 301 displays the video display screen 1810 shown in FIG. 18B, and displays video 1811 that plays back a video file on a player screen. Also, the browser 301 skips to a specific playback position 1812 of the video file using the timeline information 1013. The user is able to operate a play button and to rewind and fast forward to play back the video associated with the selected event.

Next, a flow in which a log of an image forming apparatus that has tag information tagged to recorded video of a network camera is referenced from the recorded video will be described. The browser 301 transmits a video display request to the Web UI 343 (S1711). The search conditions can also be specified in this request. The Web UI 343 replies to the browser 301 with a video display screen 1900 shown in FIG. 19A (S1712).

Control 1901 is a control specifying video search conditions. For example, when a video file targeted for display is retrieved with conditions such as date, a link to the video file is displayed in a video file list 1902. Video that plays back the video file is displayed on a player screen 1903 when the link to the video file is pressed. Also, tag information tagged to the video file is obtained from the table 1010 and displayed in a tag information field 1904. A button 1905 is a button for using the tag information displayed in the tag information field 1904 to retrieve a log of an image forming apparatus associated with this tag information. When this button 1905 is pressed, the browser 301 transmits a log search request of the image forming apparatus to the Web UI 333 with tag information on the video being display as a search condition (S1713).

The Web application 332 searches the video tag information management table 900, and obtains the job ID, error ID or event ID 903 of the log having the relevant tag information in the column 904. The Web application 332 obtains the log record from the job log table 700, the error log table 710 or the operation log table 720 using the obtained ID 903, and replies to the browser 301 with a log search result screen 1910 shown in FIG. 19B (S1714).

The above procedure enables recorded log information to be used to search for and play back video associated with the log information, and recorded video to be used to search for and display log information associated with the video.

Flow for Installing/Updating Network Camera Coordination Application 314

FIG. 20 is a diagram illustrating a flow for installing and updating the network camera coordination application 314 that is installed in the image forming apparatus 111. First, it is determined whether a request for use of the network camera coordination application 314 has been received (S2001). If a use request has been received, the application management unit 318 determines whether the network camera coordination application 314 has been installed in the image forming apparatus 111 (S2002). If No, the processing advances to step S2008. If Yes, the application management unit 318 calls the API 334 and obtains the latest version number of network camera coordination application (S2003, S2004). The application management unit 318 compares the installed version number with latest version number of the network camera coordination application (S2005). If the installed version is not the latest version, the application management unit 318 calls the API 334 and downloads the latest version of the network camera coordination application (S2006, S2007). The application management unit 318 installs or updates the downloaded network camera coordination application (S2008).

As described above, logs of an image forming apparatus can be associated with camera video by enabling registration of information on network cameras 131 capable of monitoring the image forming apparatus 111 in the device management server 121. Furthermore, the effect of being able to implement the first use case referred to at the beginning of this specification is obtained, by enabling associated camera video to be referenced from logs of an image forming apparatus. Also, the effect of being able to implement the second use case referred to at the beginning of this specification is obtained, by enabling logs of an image forming apparatus to be referenced from tag information of camera video.

According to the present embodiment, new use cases such as the following can be realized. The first use case involves recording the appearance of the image forming apparatus and the movements of the user thereof with a network camera when an event such as login, use of a function, an error or the like occurs in an image forming apparatus. Video at the time that the event occurred can be referenced from the logs of each of the image forming apparatuses, because of job and error logs being aggregated and managed in the device management system. Video at the time that the event occurred in the image forming apparatus or thereabouts can thereby be checked, in addition to log information from the image forming apparatus, enabling new analysis and investigation that was not available with conventional log information. The second use case involves specifying, if a problem is detected from the video of a network camera such as removal of the output of an image forming apparatus from the office, the image forming apparatus that is shown by the camera at that time, enabling the logs of the image forming apparatus to be tracked.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method executed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-218674, filed Oct. 21, 2013, which is hereby incorporated by reference herein in its entirety.

What is claimed is:

1. A network system comprising:
a network device;
a management system for managing the network device;
a client; and
a camera system,
wherein the network device includes a memory storing first instructions and a processor which is capable of executing the first instructions causing the network device to:
provide a setup screen for a network camera to the client by a redirecting based on a uniform resource locator (URL) corresponding to a service of the network device in response to an instruction to a screen in the client concerning the network device provided by the management system;
obtain connection information for connecting to the camera system from the management system;
obtain camera identification information of a network camera that is included in the camera system from the camera system that is connected using the connection information;
transmit the obtained camera identification information to the client connecting to a web service of the network device by the redirecting;
obtain settings from the camera system, wherein the settings are, via the setup screen provided by the network device, by accessing the camera system using the camera identification information in the client, and the settings are based on an image captured by the network camera specified by the camera identification information; and transmit the camera identification information and the settings to the management system, and wherein the management system includes a memory storing second instructions and a processor which is capable of executing the second instructions causing the management system to:

transmit screen data concerning the network device to the client, the screen data including a link of a URL corresponding to a web service of the network device;

receive the camera identification information and the settings from the network device; and manage the camera identification information and the settings in association with device identification information of the network device.

2. The network system according to claim 1, wherein the connection information is obtained from the management system after a camera setup mode is activated for the network device.

3. The network system according to claim 1, wherein the setup screen includes an image captured by the network camera specified by the camera identification information.

4. The network system according to claim 3, wherein the first instructions further cause the network device to:

narrow down the number of network cameras according to a narrowing down instruction received via the setup screen, based on one of an installation location of the network cameras, video taken by the network cameras, and placement of the network cameras; and transmit camera identification information of the narrowed down network cameras to the client.

5. The network system according to claim 1, wherein the settings include at least one of a direction, angle of view, focusing mode and surveillance priority of the network camera and a name of the settings.

6. The network system according to claim 1, wherein the first instructions further cause the network device to manage information associating history information of a network device targeted for surveillance with an image captured by a network camera associated with the network device targeted for surveillance in accordance with the managed association.

7. The network system according to claim 6, wherein when a predetermined event occurs, the network device is triggered by the predetermined event to record the predetermined event in the history information, and transmit a request for image capture by the associated network camera to the camera system, with the network device as the network device targeted for surveillance, and the predetermined event recorded in the history information is managed in association with the image whose capture was triggered by the predetermined event at the network device.

8. The network system according to claim 7, wherein the second instructions further cause the camera system to transmit tag information specifying the captured image to the network device when the request for image capture is received from the network device, and wherein the image and the history information are managed in association with each other using the tag information at the network device.

9. The network system according to claim 6, wherein the first instructions further cause the network device to transmit the history information and the managed information associating the image and the history information to the management system, and wherein the second instructions further cause the management system to save the received history information and the managed information associating the image and the history information.

10. The network system according to claim 7, wherein the network device transmits the camera identification information and the settings associated with the device identification information of the network device to the camera system together with the request for image capture, and the camera system, if image capture by the network camera corresponding to the camera identification information received together with the request for image capture has not been performed, starts image capture by the network camera corresponding to the camera identification information in accordance with the received settings.

11. The network system according to claim 1, wherein the network device is an image forming apparatus.

12. A network device that is managed by a management system, comprising:

a memory storing instructions; and a processor which is capable of executing the instructions causing the network device to:

provide a setup screen for a network camera to a client by a redirecting based on a uniform resource locator (URL) corresponding to a service of the network device in response to an instruction to a screen in the client concerning the network device provided by the management system;

obtain connection information for connecting to a camera system from the management system;

obtain camera identification information of a network camera that is included in a camera system from the camera system that is connected using the connection information;

transmit the obtained camera identification information to a client connecting to a web service of the network device by the redirecting;

obtain settings from the camera system, wherein the settings are configured, via the setup screen provided by the network device, by accessing the camera system using the camera identification information in the client, and the settings are based on an image captured by the network camera specified by the camera identification information; and transmit the camera identification information and the settings to the management system which manages the camera identification information and the settings in association with device identification information of the network device.

13. A management method in a network system including a network device, a management system for managing the network device, a client, and a camera system, the method comprising:

providing, by the network device, a setup screen for a network camera to the client by a redirecting based on a uniform resource locator (URL) corresponding to a service of the network device in response to an instruction to a screen in the client concerning the network device provided by the management system;

obtaining, by the network device, connection information for connecting to the camera system from the management system;

obtaining, by the network device, camera identification information of a network camera that is included in the camera system from the camera system that is connected using the connection information;

transmitting, by the network device, the obtained camera identification information to the client connecting to a web service of the network device by the redirecting;

obtaining, by the network device, settings from the camera system, wherein the settings are configured, via the setup screen provided by the network device, by accessing the camera system using the camera identification information in the client, and the settings are based on an image captured by the network camera specified by the camera identification information;

transmitting, by the network device, the camera identification information and the settings to the management system;

transmitting, by the management system, screen data concerning the network device to the client, the screen data including a link of a URL corresponding to a web service of the network device;

receiving, by the management system, the camera identification information and the settings from the network device; and managing, by the management system, the camera identification information and the settings in association with device identification information of the network device.

14. A method for controlling a network device, comprising:

providing a setup screen for a network camera to a client by a redirecting based on a uniform resource locator (URL) corresponding to a service of the network device in response to an instruction to a screen in the client concerning the network device provided by a management system;

obtaining connection information for connecting to a camera system from the management system;

obtaining camera identification information of a network camera that is included in a camera system from the camera system that is connected using the connection information;

transmitting the obtained camera identification information to a client connecting to a web service of the network device by the redirecting;

obtaining settings from the camera system, wherein the settings are configured, via the setup screen provided by the network device, by accessing the camera system using the camera identification information in the client, and the settings are based on an image captured by the network camera specified by the camera identification information; and transmitting the camera identification information and the settings to a management system that manages the camera identification information and the settings in association with device identification information of the network device.

15. A non-transitory computer-readable medium that has recorded thereon a program for causing a computer to perform a method, the method comprising:

providing a setup screen for a network camera to the client by a redirecting based on a uniform resource locator (URL) corresponding to a service of a network device in response to an instruction to a screen in the client concerning the network device provided by a management system;

obtaining connection information for connecting to the camera system from the management system;

obtaining camera identification information of a network camera that is included in a camera system from the camera system that is connected using the connection information;

transmitting the obtained camera identification information to a client connecting to a web service of a network device by a redirecting from a management system;

obtaining settings from the camera system, wherein the settings are configured, via the setup screen provided by the network device, by accessing the camera system using the camera identification information in the client, and the settings are based on an image captured by the network camera specified by the camera identification information; and transmitting the camera identification information and the settings to a management system that manages the camera identification information and the settings in association with device identification information of the network device.

* * * * *